(12) United States Patent
Kawamura

(10) Patent No.: US 7,507,476 B2
(45) Date of Patent: Mar. 24, 2009

(54) MULTILAYERED PELLET COMPRISING ETHYLENE-VINYL ALCOHOL COPOLYMER RESIN COMPOSITION

(75) Inventor: Syukiti Kawamura, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 11/574,590

(22) PCT Filed: Sep. 2, 2005

(86) PCT No.: PCT/JP2005/016578

§ 371 (c)(1),
(2), (4) Date: Mar. 2, 2007

(87) PCT Pub. No.: WO2006/025615

PCT Pub. Date: Mar. 9, 2006

(65) Prior Publication Data
US 2007/0299194 A1    Dec. 27, 2007

(30) Foreign Application Priority Data
Sep. 3, 2004  (JP) .............................. 2004-257486

(51) Int. Cl.
B32B 5/16 (2006.01)
(52) U.S. Cl. .................. 428/403; 428/404; 428/405; 428/406; 428/407
(58) Field of Classification Search .................. 428/403, 428/404, 407, 405, 406
See application file for complete search history.

(56) References Cited

U.S. PATENT DOCUMENTS 6,686,011 B1 * 2/2004 Tai et al. .................. 428/36.6

2004/0096683 A1   5/2004  Ikeda et al.

FOREIGN PATENT DOCUMENTS

| JP | 59-81121 | 5/1984 |
|---|---|---|
| JP | 63-230757 | 9/1988 |
| JP | 5-155919 | 6/1993 |
| JP | 7-97405 | 4/1995 |
| JP | 2001-139067 | 5/2001 |
| JP | 2001 139067 | 5/2001 |
| JP | 2001-277341 | 10/2001 |
| WO | WO 02/092643 A1 | 11/2002 |

* cited by examiner

*Primary Examiner*—Leszek Kiliman
(74) *Attorney, Agent, or Firm*—Oblon, Spivak, McClelland, Maier & Neustadt, P.C.

(57) ABSTRACT

The present invention provides a multilayered pellet having a core-shell structure, wherein the core of the core-shell structure is made of an ethylene-vinyl alcohol copolymer resin composition (A), and the shell of the core-shell structure is made of an ethylene-vinyl alcohol copolymer resin composition (B). The ethylene-vinyl alcohol copolymer resin composition (A) constituting the multilayered pellet contains any one of (i) to (iii): (i) an ethylene-vinyl alcohol copolymer (a) and a modified ethylene-vinyl alcohol copolymer (b); (ii) a modified ethylene-vinyl alcohol copolymer (b); and (iii) an ethylene-vinyl alcohol copolymer (a) and a plasticizer (d). The modified ethylene-vinyl alcohol copolymer (b) is preferably a modified ethylene-vinyl alcohol copolymer having a predetermined unit or a modified ethylene-vinyl alcohol copolymer obtained by reacting the ethylene-vinyl alcohol copolymer (a) and a monovalent epoxy compound (c) having a molecular weight of not greater than 500. Difference of the heat sealing temperature (TA) of the ethylene-vinyl alcohol copolymer resin composition (A) and the heat sealing temperature (TB) of the ethylene-vinyl alcohol copolymer resin composition (B) is in the range of 3° C. to 100° C.

9 Claims, 2 Drawing Sheets

MULTILAYERED PELLET COMPRISING ETHYLENE-VINYL ALCOHOL COPOLYMER RESIN COMPOSITION

TECHNICAL FIELD

The present invention relates to a multilayered pellet comprising an Ethylene-vinyl alcohol copolymer resin composition.

BACKGROUND ART

An ethylene-vinyl alcohol copolymer (hereinafter, may be abbreviated as an "EVOH") is excellent in transparency and gas barrier properties, but has a problem of being poor in stretching properties flexibility, and bending resistance. In order to improve this problem, a method is known in which a flexible resin such as an ethylene-vinyl acetate copolymer or an ethylene-propylene copolymer is blended with the EVOH. However, this method has a problem that the transparency is significantly lowered.

In order to improve the stretching properties, the flexibility, and the bending resistance of the EVOH, Japanese Laid-Open Patent Publication No. 63-230757 has disclosed a resin composition containing two EVOHs (A1) and (B1) The EVOH (A1) has an ethylene content of 20 to 46 mol %, and a degree of saponification of 96 mol % or more The EVOH (B1) has an ethylene content of 24 to 49 mol %, and a degree of saponification of less than 96 mo %. The EVOH (A1) is contained in a ratio of 94 to 30 parts by weight, and the EVOH (B1) is contained in a ratio of 6 to 70 parts by weight. The ethylene content of the EVOH (B1) is larger than the ethylene content of the EVOH (A1) by 4 mol % or more. The degree of saponification of the EVOH (A1) is larger than that of the EVOH (B1) by 3 mol % or more. Furthermore, the ethylene contents and solubility parameters of the EVOH (A1) and the EVOH (B1) satisfy specific formulae. It is described that this resin composition is excellent in rapidly stretchable properties when heated.

WO 02/092643 discloses a modified ethylene-vinyl alcohol copolymer obtained by using a method, in which an ethylene-vinyl alcohol copolymer and a monovalent epoxy compound having a molecular weight of 500 or less are melt-kneaded and reacted with each other in an extruder. This publication describes that the modified ethylene-vinyl alcohol copolymer is superior to an unmodified ethylene-vinyl alcohol copolymer in transparency, stretching properties, flexibility, and bending resistance.

As described above, it is possible to improve the mechanical properties such as stretching properties, flexibility, and bending resistance, and to secure sufficient transparency, by blending EVOHs or modifying an EVOH. However, these methods lower the crystallinity of EVOH, thereby increasing the moisture absorption rate. Thus, after the process of melt molding the obtained resin blend or modified EVOH into a strand, cooling the strand with water, and pelletizing the resultant strand, it is necessary to sufficiently dry the obtained pellets. The obtained resin pellets tend to stick to each other because the pellets absorb moisture. Thus, when these pellets are molten for molding, consideration to an operation or equipment for preventing moisture absorption, or redrying is necessary, and thus the operability is poor.

As a technique for preventing pellets from absorbing moisture, Japanese Laid-Open Patent Publication No. 59-81121 describes a multilayered pellet having a core-shell structure. The multilayered pellet is obtained by using a method in which a molten substance containing an olefin-vinyl alcohol copolymer resin, serving as the core, and a molten substance mainly made of an olefin resin, serving as the shell, are melt-extruded into the shape of a strand and then the strand is cooled and cut. Thus, an olefin-vinyl alcohol copolymer resin that has small melt tension and thus is difficult to extrude into a shape of a strand when employed alone can be pelletized. Thus, the moisture absorption of the pellets can be prevented.

However, when these multilayered pellets are molten for molding, a molded article comprising a resin blend of an olefin-vinyl alcohol copolymer resin and an olefin resin is obtained. This molded article may be poor in transparency. Furthermore, this publication fails to disclose the improvement of stretching properties, flexibility, and bending resistance, which is an object of the present invention.

DISCLOSURE OF INVENTION

The multilayered pellet of the present invention is a multilayered pellet having a core-shell structure, wherein the core of the core-shell structure is made of an ethylene-vinyl alcohol copolymer resin composition (A), and the shell of the core-shell structure is made of an ethylene-vinyl alcohol copolymer resin composition (B), wherein the ethylene-vinyl alcohol copolymer resin composition (A) comprises any one of (i) to (iii):

(i) an ethylene-vinyl alcohol copolymer (a) and a modified ethylene-vinyl alcohol copolymer (b);

(ii) a modified ethylene-vinyl alcohol copolymer (b); and (iii) an ethylene-vinyl alcohol copolymer (a) and a plasticizer (d), wherein the modified ethylene-vinyl alcohol copolymer (b) is at least one selected fro the group consisting of the following compounds (1) to (4):

(1) a modified ethylene-vinyl alcohol copolymer (b.1) containing 0.3 to 40 mol % of a unit of Formula (I) and 5 to 55 mol % of an ethylene unit:

wherein $R^1$, $R^2$, $R^3$, and $R^4$ represent each independently a hydrogen atom, an aliphatic hydrocarbon group having 1 to 10 carbon atoms, an alicyclic hydrocarbon group having 3 to 10 carbon atoms, or an aromatic hydrocarbon group having 6 to 10 carbon atoms, $R^3$ and $R^4$ may be bonded to each other, and $R^1$, $R^2$, $R^3$, and $R^4$ may have a hydroxyl group, a carboxyl group, or a halogen atom;

(2) a modified ethylene-vinyl alcohol copolymer obtained by reacting an ethylene-vinyl alcohol copolymer (a) and a monovalent epoxy compound (c) having a molecular weight of not greater than 500;

(3) a modified ethylene-vinyl alcohol copolymer having an ionizable group at its terminal, wherein the ionizable group is selected from the group consisting of a sulfonic acid group and its salt, a carboxylic acid group and its salt, and an ammonium group; and (4) a modified ethylene-vinyl alcohol copolymer obtained by oxidizing an ethylene-vinyl alcohol copolymer, and wherein a heat sealing temperature (TA) (unit: ° C.) of the ethylene-vinyl alcohol copolymer resin composition (A) and a heat sealing temperature (TB) (unit: ° C.) of the ethylene-vinyl alcohol copolymer resin composition (B) satisfy Formula (1):

$$3 \leq TB - TA \leq 100 \quad (1)$$

wherein the heat sealing temperature (TA) is a lower limit of an adhesion temperature at which peel strength is at least 400 g/15 mm, wherein the peel strength is determined by the process of heat-sealing two films, each being made of the ethylene-vinyl alcohol copolymer resin composition (A), at a pressure of 0.98 MPa for 1 second, and conducting T-peel test with a tensile tester at a tensile speed of 250 mm/min, and wherein the heat sealing temperature (TB) is a lower limit of an adhesion temperature at which peel strength is at least 400 g/1 mm, wherein the peel strength is determined by the process of heat-sealing two films, each being made of the ethylene-vinyl alcohol copolymer resin composition (B), at a pressure of 0.98 MPa for 1 second, and conducting T-peel test with a tensile tester at a tensile speed of 250 mm/min.

In a preferred embodiment, the weight ratio between the ethylene-vinyl alcohol copolymer resin composition (A) and the ethylene-vinyl alcohol copolymer resin composition (B) is 50/50 to 99/1.

In a preferred embodiment, the modified ethylene-vinyl alcohol copolymer (b) is the modified ethylene-vinyl alcohol copolymer (b.1).

In a preferred embodiment, both of the $R^1$ and $R^2$ are hydrogen atoms.

In a preferred embodiment, one of the $R^3$ and $R^4$ is an aliphatic hydrocarbon group having 1 to 10 carbon atoms, and the other is a hydrogen atom.

In a preferred embodiment, one of the $R^3$ and $R^4$ is $(CH_2)_i$OH (wherein i is an integer of 1 to 8), and the other is a hydrogen atom.

In a preferred embodiment, the modified ethylene-vinyl alcohol copolymer (b) is obtained by reacting the ethylene-vinyl alcohol copolymer (a) and the monovalent epoxy compound (c) having a molecular weight of not greater than 500.

In a preferred embodiment, the ethylene-vinyl alcohol copolymer resin composition (A) comprises the ethylene-vinyl alcohol copolymer (a) and the plasticizer (d).

In a preferred embodiment, the ethylene-vinyl alcohol copolymer resin composition (A) comprises: (3) a modified ethylene-vinyl alcohol copolymer having an ionizable group at its terminal, wherein the ionizable group is selected from the group consisting of a sulfonic acid group and its salt, a carboxylic acid group and its salt, and an ammonium group; or (4) a modified ethylene-vinyl alcohol copolymer obtained by oxidizing an ethylene-vinyl alcohol copolymer.

Thus, the present invention described herein makes possible the advantages of providing a multilayered pellet that can be used for preparing an EVOH resin molded article excellent in barrier properties, transparency, stretching properties, flexibility; and bending resistance, that has a low moisture absorption rate, and that does not cause sticking.

BEST MODE FOR CARRYING OUT THE INVENTION

Figure 1:
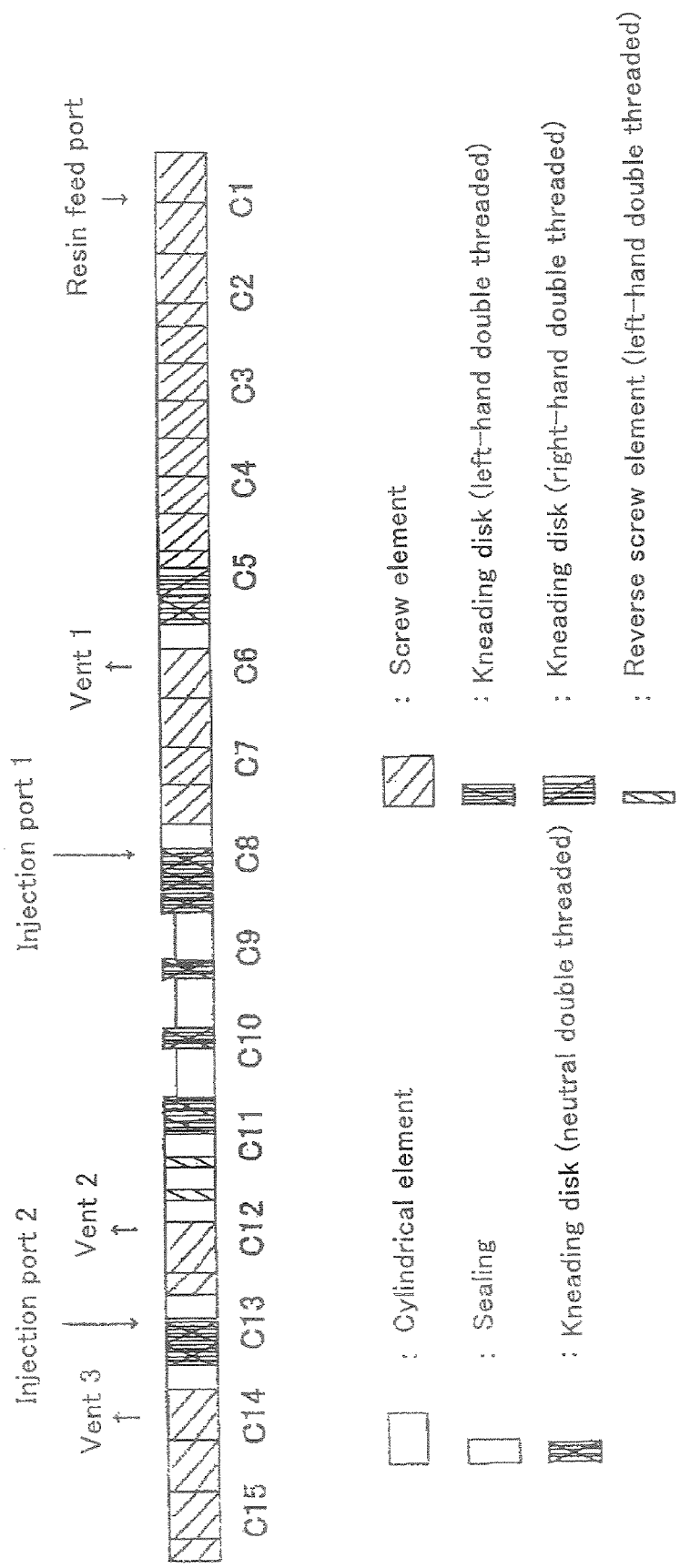
FIG. 1 is a schematic diagram of an extruder used for producing a modified EVOH (b) in Synthesis Example 1.

A multilayered pellet of the present invention has a core-shell structure, wherein the core of the core-shell structure is made of an ethylene-vinyl alcohol copolymer resin composition (A), and the shell of the core-shell structure is made of an ethylene-vinyl alcohol copolymer resin composition (B).

The ethylene-vinyl alcohol copolymer resin composition (A) is mainly made of any one of (i) to (iii) below:
(i) an ethylene-vinyl alcohol copolymer (a), and a modified ethylene-vinyl alcohol copolymer (b),
(ii) a modified ethylene-vinyl alcohol copolymer (b), and
(iii) an ethylene-vinyl alcohol copolymer (a) and a plasticizer (d).

The ethylene-vinyl alcohol copolymer resin composition (B) usually contains the ethylene-vinyl alcohol copolymer (a), and contains other components, if necessary.

Hereinafter, these components, multilayered pellets of the present invention comprising the components, and molded articles using the multilayered pellets will be described in this order. In this specification, the ethylene-vinyl alcohol copolymer resin composition (A) may be referred to as an "EVOH resin composition (A)" or a "composition (A)", and the ethylene-vinyl alcohol copolymer resin composition (B) may be referred to as an "EVOH resin composition (B)" or a "composition (B)".

(1) Ethylene-Vinyl Alcohol Copolymer (a)

In the present invention, the EVOH (a) may be contained in the EVOH resin composition (A) and the EVOH resin composition (B), or may be used as a raw material for the modified EVOH (b). The EVOH (a) is preferably obtained by saponifying an ethylene-vinyl ester copolymer. As vinyl ester for producing the ethylene-vinyl ester copolymer, vinyl acetate is typically used, but other fatty acid vinyl esters (e.g., vinyl propionate and vinyl pivalate) also can be used. Furthermore, other copolymerizable monomers can be copolymerized, within the range not interfering with the object of the present invention. Examples of the monomers include: α-olefins such as propylene, butylene, isobutene, 4-methyl-1-pentene, 1-hexene, and 1-octene; unsaturated carboxylic acids and their esters such as (meth)acrylic acid, methyl(meth)acrylate, and ethyl(meth)acrylate; vinylsilane compounds such as vinyltrimethoxysilane, vinyltriethoxysilane, vinyltri(β-methoxy-ethoxy)silane, and γ-ethacryloxypropylmethoxysilane; unsaturated sulfonic acids and their salts; alkyithiols; and vinylpyrrolidones such as N-vinylpyrrolidone.

In a case where an EVOH containing the vinylsilane compound as a copolymer component is employed as the EVOH (a), the vinylsilane compound is used for the copolymerization preferably in a ratio of 0.0002 to 0.2 mol % with respect to the total moles of all the monomers for copolymerization in order to obtain such an EVOH. When the multilayered pellets containing such an EVOH or a modified product thereof that having the vinylsilane compound as a copolymer component within this range are coextrusion molded together with a resin that is to be a base material, the consistency in melt viscosity of the base material resin with the EVOH or modified product thereof is good, and thus a uniformly multilayered molded article can be produced by coextrusion. In particular, in a case where a base resin having a high melt viscosity is employed, a molded article comprising a uniform multilayered films can be easily obtained by coextrusion. Among the above-listed compounds, in particular, vinyltrimethoxysilane and vinyltriethoxysilane are preferably used as the vinylsilane compound.

The ethylene content of the EVOH (a) used in the present invention is preferably 5 to 60 mol %. The ethylene content is more preferably 10 to 55 mol %, and even more preferably 20 to 50 mol %. If the ethylene content is less than 5 mol %, then the melt moldability may be deteriorated. If the ethylene content is more than 60 mol %, then the gas barrier properties may be insufficient. In a case where the EVOH (a) is a blend of at least two EVOHs having different ethylene contents, the average value calculated based on the blend weight ratio is taken as the ethylene content.

The degree of saponification of the vinyl ester component of the EVOH (a) used in the present invention is preferably 90% or more. The degree of saponification of the vinyl ester component is more preferably 95% or more, even more preferably 98% or more, and most preferably 99% or more. If the degree of saponification is less than 90%, then the gas barrier properties, in particular the gas barrier properties under the circumstances of a high humidity may be low. Furthermore, the thermal stability is insufficient, and thus gel or aggregates may be easily generated in the obtained molded article. In a case where the EVOH (a) is a blend of at least two EVOHs having different degrees of saponification, the average value calculated based on the blend weight ratio is taken as the degree of saponification.

The ethylene content and the degree of saponification of the EVOH (a) can be obtained by nuclear magnetic resonance (NMR).

It is also preferable to blend a boron compound with the EVOH (a), within the range not interfering with the object of the present invention. herein, examples of the boron compound include boric acids, boric acid esters, berates, and boron hydrides. More specifically, the boric acids include orthoboric acid, metaboric acid, and tetraboric acid. The boric acid esters include triethyl borate and trimethyl borate. The borates include alkali metal salts and alkaline-earth metal salts of the boric acids, and borax. Among these compounds, orthoboric acid (hereinafter, may be simply referred to as "boric acid") is preferable.

In a case where the boron compound is blended with the EVOH (a), the amount of the boron compound added is preferably 20 to 2000 ppm, and more preferably 50 to 1000 ppm, in terms of the boron element. When the boron compound is blended within this range, torque variation during melting by heating can be suppressed. If the amount is less than 20 ppm, then this effect is minimal. If the amount is more than 2000 ppm, then gelation tends to occur, resulting in poor moldability.

It is also preferable to add a phosphorus compound to the EVOH (a). With the addition of the phosphorus compound, the quality of the pellets containing the EVOH or a molded article obtained as a final product can be stabilized (for example, unfavorable coloring can be prevented). There is no specific limitation regarding the phosphorus compound used in the present invention, and various acids such as phosphoric acid and phosphorous acid and salts thereof may be used. The form of phosphates contained may be any one of primary phosphates, secondary phosphates, and tertiary phosphates, but primary phosphates are preferable. There is no specific limitation regarding the cationic species of the phosphates. Examples thereof include alkali metal salts and alkali metal salts, and alkali metal salts are preferable. Among these, sodium dihydrogen phosphate and potassium dihydrogen phosphate are preferable. In a case where the phosphorus compound is added, the amount of the phosphorus compound added is preferably 200 ppm or less, more preferably 5 to 100 ppm, and most preferably 5 to 50 ppm, in terms of the phosphoric acid radical.

It should be noted that in a case where the modified EVOH (b) is obtained by reacting the EVOH (a) and a monovalent epoxy compound (c) in the presence of a catalyst containing metal ions that belong to the groups III to XII in the periodic table as described later, it is preferable to reduce the amount of phosphate to the extent as small as possible because the phosphate inactivates the catalyst. In this case, the amount of the phosphorus compound added to the EVOH (a) is preferably 200 ppm or less, more preferably 100 ppm or less, and most preferably 50 ppm or less, in terms of the phosphoric acid radical.

The reaction for obtaining the modified EVOH (b) often takes place at a high temperature in an extruder fit such a high temperature, the obtained modified EVOH (b) may be unfavorably colored when an alkali metal salt and/or alkaline-earth metal salt is excessively present together with the EVOH (a). Furthermore, for example, the problems may occur that the viscosity of the modified EVOH (b) lowers and that the moldability lowers. Furthermore, since the alkali metal salt and/or alkaline-earth metal salt inactivates a catalyst that can be used for the reaction, and thus it is preferable to use the metal salts in an amount that is as small as possible.

In order to avoid the above-described problem, the amount of the alkali metal salt contained in the EVOH (a) is preferably 50 ppm or less in terms of the metal element. The amount of the alkali metal salt added to the EVOH (a) is more preferably 30 ppm or less, and even more preferably 20 ppm or less, in terms of the metal element. From the same viewpoint, the amount of the alkaline-earth metal salt added to the EVOH (a) is preferably 20 ppm or less, more preferably 10 ppm or less, and even more preferably 5 ppm or less, in terms of the metal element. It is most preferable that the alkaline-earth metal salt is not substantially contained in the EVOH (a).

A thermal stabilizer and an antioxidant may be blended with the EVOH (a), within the range not interfering with the object of the present invention.

The intrinsic viscosity of the EVOH (a) used in the present invention is preferably 0.06 L/g or more. The intrinsic viscosity of the EVOH (a) is more preferably 007 to 0.2 L/g even more preferably 0.05 to 0.15 L/g, and particularly preferably 0.080 to 0.12 L/g. If the intrinsic viscosity of the EVOH (a) is less than 0.06 L/g, then the EVOH (a) may be poor in stretching properties flexibility, and bending resistance. If the intrinsic viscosity of the EVOH (a) is more than 0.2 L/g, then gel or aggregates may be easily generated in a molded article that contains the modified EVOH (b) produced from this EVOH (a).

The melt flow rate (MFR) (190° C., 2160 g load) of the EVOH (a) used in the present invention is preferably 0.1 to 30 g/10 min more preferably 0.3 to 25 g/10 min and even more preferably 0.5 to 20 g/10 min. When the melting point of the resin is about 190° C. or higher, then measurements are carried out under a load of 2160 g at a plurality of temperatures above the melting point. Then, the measurement data are plotted on a semi-logarithmic graph with the inverse of the absolute temperature being on the horizontal axis and the logarithm of the MFR being on the vertical axis and the MFR at 190° C. is determined by extrapolation to 190° C. Two or more EVOHs having different MFRs may be used in combination.

(2) Modified Ethylene-Vinyl Alcohol Copolymer (b)

The modified EVOH (b) used in the present invention is a compound obtained by chemically modifying the EVOH (a). There is no limitation regarding such a modified EVOH, but it can be obtained by copolymerization with a predetermined reactive species when copolymerizing ethylene and vinyl ester, or by reacting the EVOH and a predetermined reactive species in a solvent or in an extruder for example.

Examples of the modified EVOH that can be used in the present invention include the following compounds:

(1) a modified ethylene-vinyl alcohol copolymer (b.1) having a unit of Formula (I) shown below in a predetermined ratio;

(2) a modified ethylene-vinyl alcohol copolymer obtained by reacting an ethylene-vinyl alcohol copolymer (a) and a monovalent epoxy compound (c) having a molecular weight of 500 or less;

(3) a modified ethylene-vinyl alcohol copolymer having an ionizable group at its terminal wherein the ionizable group is at least one selected from the group consisting of a sulfonic acid group and its salt, a carboxylic acid group and its salt, and an ammonium group; and (4) a modified ethylene-vinyl alcohol copolymer obtained by oxidizing an ethylene-vinyl alcohol copolymer.

Hereinafter, these modified EVOHs are described. Among these, the modified EVOHs (1) and (2) are particularly preferable.

(2.1) Modified EVOH (b.1)

The modified EVOH (b.1) contains a unit of Formula (I) in a ratio of 0.3 to 40 mol %, and an ethylene unit in a ratio of 5 to 55 mol %.

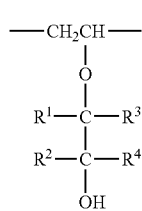

(I)

wherein $R^1$, $R^2$, $R^3$, and $R^4$ represent each independently a hydrogen atom, an aliphatic hydrocarbon group having 1 to 10 carbon atoms, an alicyclic hydrocarbon group having 3 to 10 carbon atoms, or an aromatic hydrocarbon group having 6 to 10 carbon atoms, $R^3$ and $R^4$ may be bonded to each other, and $R^1$, $R^2$, $R^3$, and $R^4$ may have a hydroxyl group, a carboxyl group, or a halogen atom.

In the unit of Formula (I) above, it is preferable that both of $R^1$ and $R^2$ are hydrogen atoms. It is more preferable that both of $R^1$ and $R^2$ are hydrogen atoms, one of $R^3$ and $R^4$ is an aliphatic hydrocarbon group having 1 to 10 carbon atoms, and the other is a hydrogen atom. The aliphatic hydrocarbon group is preferably an alkyl group or an alkenyl group. In a case where the modified EVOH (b.1) is employed as a barrier material and the gas barrier properties are particularly prioritized, it is more preferable that one of $R^3$ and $R^4$ is a methyl group or ethyl group, and the other is a hydrogen atom.

When using the modified EVOH (b.1) as a barrier material, it is also preferable that one of $R^3$ and $R^4$ is a substituent represented by $(CH_2)_iOH$ (where i is an integer of 1 to 8), and the other is a hydrogen atom in view of the gas barrier properties. In a case where the gas barrier properties of the barrier material are particularly prioritized, i is preferably an integer of 1 to 4, more preferably 1 or 2, and even more preferably 1, in the substituent represented by $(CH_2)_iOH$.

It is necessary that the amount of the unit of Formula (I) contained in the modified EVOH (b.1) is 0.3 to 40 mol %. The amount of the unit of Formula (I) is preferably 0.5 mol % or more, more preferably 1 mol % or more and even more preferably 2 mol % or more. The amount of the unit of Formula (I) is preferably 35 mol % or less, more preferably 30 mol % or less, and even more preferably 25 mol % or less. When the amount of the unit of Formula (I) contained is within this range, the modified EVOH (b.1) is provided with gas barrier properties, transparency, stretching properties, flexibility and bending resistance.

The ethylene content of the modified EVOH (b.1) is preferably 5 to 55 mol %. In order to provide the modified EVOH (b.1) with good stretching properties, flexibility and bending resistance, the ethylene content of the modified EVOH (b.1) is more preferably 10 mol % or more, even more preferably 20 mol % or more, particularly preferably 25 mol % or more, and further more preferably 31 mol % or more. In view of the gas barrier properties of the modified EVOH (b.1), the ethylene content of the modified EVOH (b.1) is more preferably 50 mol % or less, and even more preferably 45 mol % or less. If the ethylene content is less than 5 mol %, then the melt moldability may be deteriorated. If the ethylene content is more than 55 mol %, then the gas barrier properties may be insufficient.

There is no specific limitation regarding a method for producing the modified EVOH (b.1), but it is preferably obtained by reacting the ethylene-vinyl alcohol copolymer (a) and the monovalent epoxy compound (c) having a molecular weight of 500 or less (hereinafter, the monovalent epoxy compound (c) having a molecular weight of 500 or less may be referred to as an "epoxy compound (c)", a "compound (c)", or the like).

The constituents of the modified EVOH (b.1), other than the unit of the above Formula (I) and the ethylene unit, are mainly a vinyl alcohol unit. In the above-described production method, the vinyl alcohol unit is usually a vinyl alcohol unit derived from the raw material EVOH (a) and has not been reacted with the monovalent epoxy compound (c). An unsaponified vinyl acetate unit that may be contained in the EVOH (a) is usually contained as it is in the modified EVOH (b.1). The modified EVOH (b.1) is usually a random copolymer containing these constituents (units), and its structure can be known from measurement results of NMR and/or melting point. Furthermore, other constituents may be contained, within the range not interfering with the object of the present invention.

The melt flow rate (MFR) (190°0 C., 2160 g load) of the modified EVOH (b.1) is preferably 0.1 to 30 g/10 min, more preferably 0.3 to 25 g/10 min, and even more preferably 0.5 to 20 g/10 min. When the melting point of the resin is about 190° C. or higher, then measurements are carried out under a load of 2160 g at a plurality of temperatures above the melting point. Then, the measurement data are plotted on a semi-logarithmic graph with the inverse of the absolute temperature being on the horizontal axis and the logarithm of the MFR being on the vertical axis, and the MFR at 190° C. is determined by extrapolation to 190° C.

(2.2) Modified EVOH (b) obtained from EVOH (a) and monovalent epoxy compound (c) having molecular weight of 500 or less The modified EVOH (b) used in the present invention is obtained also by reacting the ethylene-vinyl alcohol copolymer (a) and the monovalent epoxy compound (c) having a molecular weight of 500 or less, as described above. The modified EVOH (b) may be various EVOH derivatives, depending on the type of the epoxy compound that is used. Thus, these modified EVOHs may include the modified EVOH (b.1).

The monovalent epoxy compound (c) having a molecular weight of 500 or less used in this method is an epoxy compound having only one epoxy group in a molecule. In a case where a polyvalent epoxy compound having two or more epoxy groups is used, the effects of the present invention cannot be achieved. It should be noted that in a process of producing a monovalent epoxy compound, a very small amount of polyvalent epoxy compound may be contained therein. A monovalent epoxy compound containing a very small amount of polyvalent epoxy compound may be used as the epoxy compound (c) of the present invention, within the range not interfering with the effects of the present invention.

There is no specific limitation regarding the epoxy compound (c) used in the present invention. More specifically, compounds represented by Formulae (II) to (VII) below are preferably used. In the following formulae, each of $R^5$, $R^6$, $R^7$, $R^8$, and $R^9$ represents a hydrogen atom, an aliphatic hydrocarbon group (e.g., an alkyl group or an alkenyl group) having 1 to 10 carbon atoms, an alicyclic hydrocarbon group (e.g., a cycloalkyl group or cycloalkenyl group) having 3 to 10 carbon atoms, or an aromatic hydrocarbon group (e.g., phenyl group) having 6 to 10 carbon atoms, and i, j, k, l, and m represent each independently an integer of 1 to 8.

(II)

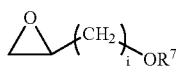
(III)

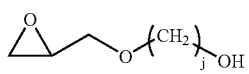
(IV)

(VI)

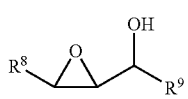

(VII)

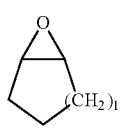

(VIII)

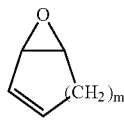

Examples of the epoxy compound (c) represented by Formula (II) above include epoxyethane ethylene oxide), epoxypropane, 1,2-epoxybutane, 2,3-epoxybutane, 3-methyl-1,2-epoxybutane, 1,2-epoxypentane, 2,3-epoxypentane, 3-methyl-1,2-epoxypentane 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 3-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane. 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-ethyl-1,2-epoxyheptane, 4-propyl-1,2-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 6-methyl-3,4-epoxyheptane, 6-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,6-epoxydecane, 5,6-epoxydecane, 1,2-epoxyundecane, 2,3-epoxyundecane, 3,4-epoxyundecane, 4,5-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-epoxypropane, 3-phenyl-1,2-epoxypropane, 1-phenyl-1,2-epoxybutane, 3-phenyl-1,2-epoxybutane, 4-phenyl-1,2-epoxybutane, 1-phenyl-1,2-epoxypentane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, and 6-phenyl-1,2-epoxyhexane.

Examples of the epoxy compound (c) represented by Formula (III) above include methyl glycidyl ether, ethyl glycidyl ether, n-propyl glycidyl ether isopropyl glycidyl ether, n-butyl glycidyl ether, isobutyl glycidyl ether, tert-butyl glycidyl ether, 1,2-epoxy-3-pentyloxypropane, 1,2-epoxy-3-hexyloxy-propane, 1,2-epoxy-3-heptyloxypropane, 1,2-epoxy-3-octyloxypropane, 1,2-epoxy-3-phenoxypropane, 1,2-epoxy-3-benzyloxypropane, 1,2-epoxy-4-methoxybutane, 1,2-epoxy-4-ethoxybutane, 1,2-epoxy-4-propoxybutane, 1,2-epoxy-4-butoxybutane, 1,2-epoxy-4-pentyloxybutane, 1,2-epoxy-4-hexyloxybutane, 1,2-epoxy-4-heptyloxybutane, 1,2-epoxy-4-phenoxybutane, 1,2-epoxy-4-benzyloxybutane, 1,2-epoxy-5-methoxypentane, 1,2-epoxy-5-ethoxypentane, 1,2-epoxy-5-propoxypentane, 1,2-epoxy-5-butoxypertane, 1,2-epoxy-5-pentyloxypentane, 1,2-epoxy-5-hexyloxypentane, 1,2-epoxy-5-phenoxypentane, 1,2-epoxy-6-methoxyhexane, 1,2-epoxy-6-ethoxyhexane, 1,2-epoxy-6-propoxyhexane, 1,2-epoxy-6-butoxyhexane, 1,2-epoxy-6-heptyloxyhexane, 1,2-epoxy-7-methoxyheptane, 1,2-epoxy-7-ethoxyheptane, 1,2-epoxy-7-propoxyheptane, 1,2-epoxy-7-butyloxyheptane, 1,2-epoxy-8-methoxyheptane 1,2-epoxy-8-ethoxyheptane, 1,2-epoxy-8-butoxyheptane, glycidol, 3,4-epoxy-1-butanol, 4,5-epoxy-1-pentanol, 5,6-epoxy-1-hexanol, 6,7-epoxy 1-heptanol, 7,8-epoxy-1-octanol, 8,9-epoxy-1-nonanol, 9,10-epoxy-1-decanol, and 10,11-epoxy-1-undecanol.

Examples of the epoxy compound (c) represented by Formula (IV) above include ethylene glycol monoglycidyl ether, propanediol monoglycidyl ether, butanediol monoglycidyl ether, heptanediol monoglycidyl ether, hexanediol monoglycidyl ether, heptanediol monoglycidyl ether, and octanediol monoglycidyl ether.

Examples of the epoxy compound (c) represented by Formula (V) above include 3-(2,3-epoxy)propoxy-1-propene, 4-(2,3-epoxypropoxy-1-butene, 5-(2,3-epoxy)propoxy-1-pentene, 6-(2,3-epoxy)propoxy-1-hexene, 7-(2,3-epoxy)propoxy-1-heptene, and 8-(2,3-epoxy)propoxy-1-octene.

Examples of the epoxy compound (c) represented by Formula (VI) above include 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-4-ethyl-1-hexanol, 3,4-epoxy 5-methyl-2-hexanol, 3,4-epoxy-5,5-dimethyl-2-hexanol, 3,4-epoxy-2-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-2-octanol, 4,5-epoxy-3-octanol, 5,6-epoxy-4-octanol, 2,3-epoxy-4-octanol, 1,2-epoxy-3-octanol, 2,3-epoxy-1- nonanol, 3,4-epoxy-2-nonanol, 4,5-epoxy-3-nonanol, 5,6-epoxy-4-nonanol, 3,4-epoxy-5-nonanol, 2,3-epoxy-4-nonanol, 1,2-epoxy-3-nonanol, 2,3-epoxy-1-decanol, 3 4-epoxy-2-decanol, 4,-epoxy-3-decanol, 5,6-epoxy-4-decanol, 6,7-epoxy-5-decanol, 3,4-epoxy-5-decanol, 2,3-epoxy-4-decanol, and 1,2-epoxy-3-decanol.

Examples of the epoxy compound (c) represented by Formula (VII) above include 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycycloundecane, and 1,2-epoxycyclododecane.

Examples of the epoxy compound (c) represented by Formula (VIII) above include 3,4-epoxycyclopentene 3,4-epoxycyclohexene, 3,4-epoxycycloheptene, 3,4-epoxycyclooctene, 3,4-epoxycyclononene, 1,2-epoxycyclodecene, 1,2-epoxycycloundecene, and 1,2-epoxycyclododecene.

The epoxy compound (c) used in the present invention particularly preferably has 2 to 8 carbon atoms. The epoxy compound (c) preferably has 2 to 6 carbon atoms, and more preferably 2 to 4 carbon atoms, because the compound can be easily handled and reacted well with the EVOH (a). Furthermore, the epoxy compound (c) is preferably a compound represented by Formula (II) or Formula (III) above. It is particularly preferable to use 1,2-epoxybutane, 2,3-epoxybutane, epoxypropane, epoxyethane, or glycidol, and among these, it is preferable to use epoxypropane or glycidol, because the reactivity of such compound with respect to the EVOH (a) is high and the resultant modified EVOH (b) has high gas barrier properties. In a case where the multilayered pellets of the present invention are used for producing a molded article that is required to be hygienically clean, for example, used for packaging materials for foods, drinks, medicines, and the like, a compound used as the epoxy compound (c) is preferably 1,2-epoxybutane, 2,3-epoxybutane, epoxypropane, or epoxyethane, and particularly preferably epoxypropane.

For the reaction of the EVOH (a) and the epoxy compound (c), the epoxy compound (c) is provided for the reaction preferably in a ratio of 1 to 50 parts by weight, more preferably 2 to 40 parts by weight, and particularly preferably 5 to 35 parts by weight, with respect to 100 parts by weight of the EVOH (a).

There is no specific limitation regarding the method of the reaction. Preferable examples thereof include a production method in which the EVOH (a) and the epoxy compound (c) are reacted in a solvent, and a production method in which the EVOH (a) and the epoxy compound (c) are reacted in an extruder.

In the production method in which the reaction is carried out in a solvent, the modified EVOH (b) is obtained by reacting the monovalent epoxy compound (c) with the EVOH (a) dissolved in the solvent in the presence of an acid catalyst or an alkali catalyst. Furthermore, the modified EVOH (b) can be produced also by dissolving the EVOH (a) and the epoxy compound (c) in a reaction solvent and heating the mixture. As the reaction solvent, it is preferable to use a polar aprotic solvent that is a good solvent for the EVOH (a), such as dimethylsulfoxide, dimethylformamide, dimethylacetamide, and N-methylpyrrolidone.

Examples of the reaction catalyst include: acid catalysts such as p-toluenesulfonic acid methanesulfonic acid, trifluoromethane sulfonic acid, sulfuric acid, and boron trifluoride; and alkali catalysts such as sodium hydroxide, potassium hydroxide, lithium hydroxide, and sodium methoxide Among these, acid catalysts are preferably used. An appropriate amount of the catalyst is approximately 0.0001 to 10 parts by weight with respect to 100 parts by weight of the EVOH (a). An appropriate reaction temperature is within a range from room temperature to 150° C.

In the production method in which the EVOH (a) and the epoxy compound (c) are reacted in an extruder there is no specific limitation regarding the extruder that is used, but the EVOH (a) and the epoxy compound (c) are preferably reacted while being kneaded in a single screw extruder a twin screw extruder or a multi-screw extruder having more than two screws, at a temperature of approximately 180 to 300° C. In a case where a catalyst is present during the reaction in an extruder a comparatively low temperature for melting is preferable, as described later. In a case where a catalyst is not used, a preferable temperature is approximately 200 to 300° C.

In a case where a twin screw extruder or a multi-screw extruder having more than two screws is used, the pressure of the vessel for reaction can be easily increased by changing the screw configuration, and thus the EVOH (a) and the epoxy compound (c) can be efficiently reacted. In a case where single screw extruders are employed, the pressure of the vessel for reaction can be increased by coupling two or more extruders and providing a valve at the conjunction portion (i e., a resin path) between the extruders Similarly, it is also possible to couple two or more twin screw extruders or multi-screw extruders having more than two screws.

Comparing the production method in which the reaction is carried out in an extruder and the production method in which the reaction is carried out in a solvent, it would be found that the reaction carried out in a solvent is more complicated Namely, this method requires a solvent for dissolving the EVOH (a), and the solvent should be recovered and removed from the reaction system after the reaction has been completed. In order to increase the reactivity between the EVOH (a) and the monovalent epoxy compound (c), it is generally preferable that the reaction system is kept under a heated and/or pressurized condition. In the reaction in an extruder the reaction system can be kept under a heated and/or pressurized condition more easily than in the reaction in a solvent, and thus the reaction carried out in an extruder is highly advantageous also from this viewpoint.

WO 02/092643 describes in detail a method for producing the modified EVOH (b) that is obtained by reacting the EVOH (a) and the monovalent epoxy compound (c).

(2.3) Modified Ethylene-Vinyl Alcohol Copolymer having an Ionizable Group at its Terminal This modified EVOH is a modified EVOH that has an ionizable group at its terminal, wherein the ionizable group is at least one selected from the group consisting of a sulfonic acid group and its salt, a carboxylic acid group and its salt, and an ammonium group. This compound is produced using a method such as: a method in which ethylene and vinyl ester are copolymerized in the coexistence, as a chain transfer agent, of a compound such as alcohol, aldehyde, or thiol having the ionizable group, and the obtained ester is saponified; or a method in which the ionizable group is introduced to the terminal of the molecule of the EVOH by chemical reaction. For example, Japanese Laid-Open Patent Publication No. 5-155919 describes such a modified EVOH (2.4) Modified Ethylene-Vinyl Alcohol Copolymer Obtained by Oxidizing Ethylene-Vinyl Alcohol Copolymer This modified EVOH is a compound obtained by oxidizing an EVOH with an oxidizing agent such as hydrogen peroxide, and described in Japanese Laid-Open Patent Publication No. 7-97405, for example (3) Ethylene-Vinyl Alcohol Copolymer Resin Composition (A)

The EVOH resin composition (A) used for the core portion of the multilayered pellets of the present invention may comprise any one of (i) to (iii):

(i) the EVOH (a) and the EVOH (b);
(ii) the modified EVOH (b); or
(iii) the EVOH (a) and the plasticizer (d).

In any case, the composition (A) may comprise additives and the like, if necessary. The composition (A) has a predetermined heat sealing temperature as described later.

In the case of (iii), there is no specific limitation regarding a plasticizer (d) that can be used. Examples thereof include: low-molecular weight plasticizers having a low volatility (e.g., an aromatic ester an aliphatic ester, a phosphoric acid ester, and their epoxy derivatives); and high-molecular weight plasticizers (e.g., polyethylene glycol.) High-molecular weight plasticizers are preferable because they are vaporized less in melt-molding and thus keep stable quality.

Among the low-molecular weight plasticizers having a low volatility, examples of the aromatic ester include dibutyl phthalate, dioctyl phthalate, diheptyl phthalate, bis(2-ethylhexyl)phthalate, dicyclohexyl phthalate, butyl lauryl phthalate, diisooctyl phthalate, butyl cocoyl alkyl phthalate, ditridecyl phthalate dilauryl phthalate, disodecyl phthalate, butyl benzyl phthalate, octyldecanoyl phthalate, dimethyl glycol phthalate, ethylphthalyl ethylene glycolate, methylphthalyl ethylene glycolate, butylphthalyl butylene glycolate, dinonyl phthalate diheptyl phthalate, octyl decyl phthalate, ditridecyl phthalate, dicapryl phthalate, bis(3,5,5-trimethylhexyl)phthalate, isooctyl isodecyl phthalate, bis(diethylene glycol monomethyl ether)phthalate, and benzophenol.

Examples of the aliphatic ester preferably include monoester, diester, and tri- or higher ester of polyhydric alcohol (dihydric, trihydric, or higher alcohol) and higher fatty acid (higher fatty acid having 8 or more carbon atoms, and preferably 8 to 30 carbon atoms) Among the esters of polyhydric alcohol and higher fatty acid, examples of the stearic acid ester include glycerol monostearate, glycerol mono(1,2-dihydroxy stearate, glycerol distearate, diglycerol monostearate, and tetraglycerol monostearate. Examples of the lauric acid ester include glycerol monolaurate, diglycerol monolaurate, and tetraglycerol monolaurate. Other examples of the aliphatic ester include polypropylene adipate, diisodecyl adipate, bis(2-methylhexyl)adipate, dicapryl adipate, diisooctyl adipate, octyl decyl adipate, isooctyl isodecyl adipate, dibutyl fumarate, dioctyl fumarate, triethyl citrate, acetyl triethyl citrate, tributyl citrate, and acetyl tributyl citrate.

Examples of the phosphoric acid ester include tricresyl phosphate, phenyl dicresyl phosphate, xylenyl dicresyl phosphate, cresyl dixylenyl phosphate, triphenyl phosphate, tributyl phosphate, trichloroethyl phosphate, trioctyl phosphate, tributyl phosphate, trichloroethyl phosphate, trioctyl phosphate, triethyl phosphate, and arylalkyl phosphate.

Examples of the epoxy compound include butyl epoxy stearate, octyl epoxy stearate, epoxybutyl oleate, epoxidized butyl oleate, epoxidized soybean oil, epoxidized linseed oil, epoxidized alkyl oil, and epoxidized alkyl oil alcohol ester.

There is no specific limitation regarding the high-molecular weight plasticizer used in the present invention, as long as it has an affinity with the EVOH and is highly compatible with the EVOH. Examples thereof include polyethylene glycol, polyvinylpyrrolidone, polyvinyl acetate, and polyethylene-vinyl acetate copolymer.

Examples of the additives that are contained, if necessary, in the EVOH resin composition (A) include an antioxidant, a thermal stabilizer, an ultraviolet absorber, an antistatic agent, a lubricant, a colorant, a filler, and high-molecular weight compounds (the EVOH (a), the modified EVOH (b), and polymers other than the high-molecular weight plasticizer). These additives are contained, within the range not interfering with the function and the effects of the present invention. Specific examples of the additives include the following.

Examples of the antioxidant include 2,5-di-t-butylhydroquinone, 2,6-di-t-butyl-p-cresol, 4,4'-thiobis(6-t-butylphenol), 2,2'-methylene-bis(4-methyl-6-t-butylphenol), octadecyl-3-(3',5'-di-t-butyl-4'-hydroxy phenyl)propionate, and 4,4'-thiobis(6-t-butylphenol).

Examples of the ultraviolet absorber include ethylene-2-cyano-3,3'-diphenyl acrylate, 2-(2'-hydroxy-5'-methylphenyl)benzotriazole, 2-(2'-hydroxy-5'-methylphenyl)benzotriazole, 2-(2'-hydroxy-5'-methylphenyl)benzotriazole, 2-(2'-hydroxy-3'-t-butyl-5'-methylphenyl) 5-chlorobenzotriazole, 2-hydroxy-4-methoxybenzophenone, and 2,2'-dihydroxy-4-methoxybenzophenone.

Examples of the antistatic agent include pentaerythritol monostearate, sorbitan monopalmitate, sulfated polyolefins, polyethylene oxide, and carbowax.

Examples of the lubricant include ethylene bisstearamide and butyl stearate.

Examples of the colorant include carbon black, phthalocyanine, quinacridone, indoline, azo pigment, and red iron oxide.

Examples of the filler include glass fiber, asbestos, ballastonite, and calcium silicate.

Examples of the thermal stabilizer include hydrotalcite compound, hindered phenol thermal stabilizer, hindered amine thermal stabilizer, and a metal salt of a higher aliphatic carboxylic acid (e.g., calcium stearate and magnesium stearate).

Among these additives, the thermal stabilizer is used, for example. in order to improve the melt stability when melt kneading components of the composition. One, two, or more of these compounds are used, within the range not interfering with the function and the effects of the present invention. For example, these compounds are contained in a ratio of 0.01 to 1 wt % in the EVOH resin composition (A).

In a case where the EVOH resin composition (A) contains the EVOH (a) and the modified EVOH (b) as in the case of (i), the EVOH (a) and the modified EVOH (b) are contained usually in a weight ratio of 5:95 to 95:5, and preferably 15:85 to 85:15. The modified EVOH (b) is contained usually in a ratio of 1 wt % or more, and preferably 1.5 to 95 wt %, in the composition. In a case where only the modified EVOH (b) is mainly contained as in the case of (ii), the modified EVOH (b) is contained in a ratio of 5 wt % or more, and preferably 80 to 92 wt %, in the composition. In a case where the EVOH (a) and the plasticizer are contained as in the case of (iii), the plasticizer is contained usually in a ratio of 1 to 30 parts by weight, and preferably 4 to 20 parts by weight, with respect to 100 parts by weight of the EVOH (a). The plasticizer is contained usually in a ratio of 0.5 wt % or more, and preferably 1.5 to 15 wt %, in the composition.

(4) Ethylene-Vinyl Alcohol Copolymer Resin Composition (B)

The EVOH resin composition (B) used for the shell portion of the multilayered pellets of the present invention comprises the EVOH as a main component. The EVOH (a) is usually used alone, and materials such as other resins and additives may be contained, if necessary. The composition (B) has a heat sealing temperature that is different from the heat sealing temperature of the composition (A) by a predetermined value, as described later.

(5) Multilayered Pellet

The multilayered pellets of the present invention have a core-shell structure, wherein the core of the core-shell structure is made of the EVOH resin composition (A), and the shell of the core-shell structure is made of the EVOH resin composition (B).

As the EVOH resin composition (A) and the EVOH resin composition (B), any materials can be selected from among the materials listed as the compositions (A) and (B). Herein, it is necessary that the heat sealing temperature (TA) (unit: ° C.) of the EVOH resin composition (A) and the heat sealing temperature (TB) (unit: ° C.) of the EVOH resin composition (B) satisfy Formula (1) below:

$$3 \leq TB - TA \leq 100 \quad (1)$$

wherein the heat sealing temperature (TA) is a lower limit of an adhesion temperature at which peel strength is at least 400 g/15 mm, wherein the peel strength is determined by the process of heat-sealing two films, each being made of the ethylene-vinyl alcohol copolymer resin composition (A), at a pressure of 0.98 MPa for 1 second, and conducting T-peel test with a tensile tester at a tensile speed of 250 mm/min. Similarly, the heat sealing temperature (TB) is a lower limit of an adhesion temperature at which peel strength is at least 400 g/15 mm, wherein the peel strength is determined by the process of heat-sealing two films, each being made of the ethylene-vinyl alcohol copolymer resin composition (B), at a pressure of 0.98 MPa for 1 second, and conducting T-peel test with a tensile tester at a tensile speed of 250 mm/min.

The value of TB–Ta is preferably 5 or more, and more preferably 10 or more.

The multilayered pellets of the present invention can be produced by an ordinary coextrusion method, using the composition (A) and the composition (B).

For example, the EVOH resin composition (A) and the EVOH resin composition (B) are supplied in a molten state to a die from an extruder wherein the die has a structure for forming the core-shell structure, whereby a strand having the core-shell structure is prepared by extrusion molding. Then, the strand is cut, and thus the multilayered pellets are produced, as described later.

In this method, there is no specific limitation regarding the process for mixing the components of the EVOH composition (A) or the EVOH composition (B). For example, in the case of the EVOH composition (A), the resin pellets of the modified EVOH (b), the EVOH (a), and the like are dry-blended and subjected to melt-molding for the preparation of the multilayered pellets. Alternatively, the resin pellets of the modified EVOH (b), the EVOH (a), and the like may be melt-kneaded by Banbury mixers a single or twin screw extrude, or the like to be palletized, and the resultant pellets can be supplied for melt-molding to prepare the multilayered pellets. In order to prevent deterioration of the resin during blending, it is preferable to seal the hopper inlet with nitrogen gas and extrude the resin at a low temperature. It is preferable to use an extruder with high kneading ability to allow the components to be finely and uniformly dispersed, because this can provide good barrier properties and good transparency, and can prevent gels and aggregates from being generated or mixed.

Kneading of the present invention is important to ensure good dispersion of the components in the resin compositions. As the kneader for providing a composition having high-level dispersion, continuous kneaders such as a continuous intensive mixer and a kneading type twin screw extruder (co-rotational or counter-rotational) are most preferable. Batch kneaders such as Banbury mixer, an intensive mixer, and a pressure kneader may also be used. As another continuous kneader, a device using a rotary disk having a trituration mechanism such as a stone mill, for example, the KCK Kneading Extruder manufactured by KCK Co., Ltd., may be used. Those commonly used as kneaders also include a single screw extruder provided with a kneading portion (e.g., Dulmage and CTM) and a simple kneader such as Brabender mixer.

Among these, the continuous intensive mixer is most preferable in view of the object of the invention. For example, FCM manufactured by Farrel Corporation, CIM manufactured by The Japan Steel Works, Ltd, and KCM, LCM and ACMt manufactured by Kobe Steel, Ltd are commercially available. In practice, it is preferable to use a device equipped with a single screw extruder underneath such a kneader, for achieving kneading and extrusion palletizing simultaneously. Also used for the kneading is a twin screw kneading extruder equipped with a kneading disk or kneading rotor, such as TEX manufactured by The Japan Steel Works, Ltd., ZSK manufactured by Werner & Pfleiderer Corp., TEM manufactured by Toshiba Machine Co., Ltd., and PCM manufactured by Ikegai Tekko Co, Ltd.

When the above continuous kneaders are employed, the shape of the rotor or disk plays an important role. In particular, the gap between the mixing chamber and the rotor chip or disk chip (chip clearance) is important: being too narrow or too wide fails to provide a resin composition having good dispersion. The chip clearance is most preferably 1 to 5 mm.

The rotational speed of the rotor of the kneader is 100 to 1200 rpm, preferably 150 to 1000 rpm, and more preferably 200 to 800 rpm. The inner diameter (D) of the chamber of the kneader is 30 mm or more, and preferably 50 to 400 mm. The ratio L/D with respect to the length (L) of the chamber of the kneader is preferably 4 to 30. A single kneader may be used, or two or more kneaders may be used in combination. A longer kneading time provides better results. However, considering the prevention of deterioration of the resin and the cost, the kneading time is 10 to 600 seconds, preferably 15 to 200 seconds, and most preferably 15 to 150 seconds.

In this manner, the components of the EVOH resin compositions (A) and (B) are mixed, molten, and supplied to a die, and a multilayered strand is formed as described above. There is no specific limitation regarding the thickness of the strand but the diameter is preferably 0.5 to 5 mm, and more preferably 2 to 4 mm. After the melt-extrusion, the resultant strand is cooled. In an ordinary cooling process the strand is introduced in a cooling water tank. The multilayered pellets of the present invention are obtained by cutting the cooled strand having a core-shell structure such that the length is preferably 1.0 to 50 mm and more preferably 2.5 to 3.5 mm Similar to the structure of the above-described strand, the multilayered pellets of the present invention have a structure in which a core layer comprising the EVOH resin composition (A) is covered with a shell layer comprising the EVOH resin composition (B).

There is no specific limitation regarding the ratio between the core layer and the shell layer in the multilayered pellets of the present invention, but in order to exert the effects of the present invention the weight ratio between the core layer and the shell layer is preferably 5/95 to 99/1, more preferably 50/50 to 99/1, and particularly preferably 80/20 to 90/10. If the core layer is contained in a ratio smaller than the above, then it is difficult to contain the EVOH resin composition (A) at a high ratio. On the other hand, if the shell layer is contained in a ratio smaller than the above, then the shell layer is thin, and the moisture absorption rate cannot be sufficiently lowered.

As described above, the multilayered pellets of the present invention have a core-shell structure selectively comprising the composition (A) and the composition (B) that have a specific difference in heat sealing temperature. Thus, the moisture absorption rate of the pellets is low, and a molded article obtained using the pellets is excellent in barrier properties, transparency, stretching properties, flexibility, bending resistance. It seems that the reason for this is the following. The EVOH resin composition (A) is a material that is excellent in barrier properties and transparency, and excellent in stretching properties, flexibility, and bending resistance. On the other hand, the EVOH resin composition (B) has a comparatively lower flexibility than the EVOH resin composition (A), but has an extremely low moisture absorption rate. Accordingly, with the core-shell structure using these compositions, the moisture absorption rate of the pellets is low, and thus redrying is not necessary or redrying conditions can be loose when producing the pellets. Thus, the handling ability of the pellets is improved.

It seems that the difference in heat sealing temperature reflects the difference in moisture absorption properties, which results from the findings of the inventors that improved stretching properties, flexibility, and bending resistance obtained by, for example, modifying the EVOH lower crystallinity, thereby increasing moisture absorption rate and lowering heat sealing temperature.

The multilayered pellets of the present invention comprises two kinds of resin compositions having a common resin (i.e., EVOH), in which the EVOH resin composition (A) serves as the core layer, and the EVOH resin composition (B) serves as the shell layer. A molded article obtained by kneading and molding these multilayered pellets is a mixture of the EVOH resin compositions (A) and (B) (hereinafter, may be referred to as a "mixed EVOH resin composition"). The molded article comprising this mixed EVOH resin composition is excellent in various properties such as barrier properties, transparency, stretching properties, flexibility, and bending resistance derived form the EVOH resin composition (A), without impairing such various properties.

In a case where the mixed EVOH resin composition is in the form of a film, the oxygen permeation rate of the film at 20° C. and 65% RH is preferably not greater than 100 cc·20 $\mu m/m^2 \cdot day \cdot atm$. The oxygen permeation rate is more preferably not greater than 50 cc·20 $\mu m/m^2 \cdot day \cdot atm$, even more preferably not greater than 20 cc·20 $\mu m/m^2 \cdot day \sim atm$, and particularly preferably not greater than 10 cc·20 $\mu/m^2 \cdot day \cdot atm$. This low oxygen permeation rate enables the mixed EVOH resin composition to be used preferably as a barrier material, and particularly preferably as containers for packaging foods.

Furthermore, in the mixed EVOH resin composition used in the present invention, in the form of a film, the permeation rate of carbon dioxide gas at 20° C. and 6'% RH is preferably not greater than 500 cc·20 $\mu m/m^2 \cdot day \cdot atm$. The permeation rate of carbon dioxide gas is more preferably not greater than 200 cc·20 $\mu m/m^2 \cdot day \cdot atm$, even more preferably not greater than 100 cc·20 $\mu m/m^2 \cdot day \cdot atm$, and particularly preferably not greater than 50 cc·20 $\mu m/m^2 \cdot day \cdot atm$. This low permeation rate of carbon dioxide gas enables the mixed EVOH resin composition to be used preferably as a barrier material, and particularly preferably as containers of carbonated drinks.

(6) Molded Article using Multilayered Pellet

The multilayered pellets of the present invention can be used for producing various molded articles. For example, the multilayered pellets are melt-molded into molded articles such as a film a sheet, a container, a pipe, a hose, and a fiber. The molded articles may be single layered molded articles obtained by melt-molding the multilayered pellets, or may be multilayered molded articles also containing a layer of another resin or resin mixture. In melt-molding, extrusion molding, melt spinning, injection molding, injection blow molding, and the like can be employed. Usually, the temperature for melting is approximately 120 to 270° C. In a case where the obtained molded articles are in the form of a film, a sheet, a fiber, and the like, then the molded articles can be stretched uniaxially or biaxially. Furthermore, the molded articles can be pulverized and molded again for reuse.

In a case where single layered molded articles are produced using the multilayered pellets of the present invention, various molded articles are obtained preferably by extrusion molding. There is no specific limitation regarding an extrusion molding method. Preferable examples thereof include film extrusion casting, sheet extrusion casting, pipe extrusion molding, hose extrusion molding, profile extrusion molding, extrusion blow molding, and blown film extrusion molding. Furthermore, extrusion molded articles obtained by using these molding methods can be subjected to secondary processing such as uniaxially or biaxially stretching, or heat molding.

As described above, a conventional EVOH is excellent in transparency and gas barrier properties, but has a problem of being poor in stretching properties, flexibility, and bending resistance. Thus, in a case where the EVOH is used for a bottle that is required to have shock resistance, or for a film or a flexible packaging container that is required to have flexibility and bending resistance, it is often necessary to layer the EVOH and another resin. On the contrary, the molded article produced from the multilayered pellets of the present invention is excellent in various properties such as barrier properties, transparency; stretching properties. flexibility, and bending resistance. Thus, the molded article can be used as a single layered molded article, even for the use that requires shock resistance and/or bending resistance. The present invention is significant also from the viewpoint that it can be used for various purposes as mentioned above.

A molded article obtained from the multilayered pellets of the present invention is excellent in barrier properties, shock resistance, flexibility, and bending resistance. Thus, preferable examples of a single layered molded article obtained from these multilayered pellets include a film, an extrusion blow molded article (preferably a bottle, for example), a flexible packaging container (preferably a flexible tube or a flexible pouch, for example), a pipe, a hose, and profile-molded articles. Furthermore, the film is particularly preferably a stretched film in order to exert excellent stretching properties of the molded article produced from the multilayered pellets of the present invention. Among these, a stretched film is preferable that has been stretched at least twofold in a uniaxial direction. Furthermore, it is also preferable to use the stretched film as a heat shrinkable film.

In order to improve barrier properties and form retaining capacity at high temperature and humidity, or in order to improve heat-shrinkable properties when used as a heat shrinkable film and the like, the molded article produced from the multilayered pellets of the present invention may be provided with a crosslinked structure, within the range not interfering with the function and the effects of the present invention. There is no specific limitation regarding a method for forming the crosslinked structure. Preferable examples thereof include an irradiation method with energy beams. Examples of the energy beams include ionizing radiation such as ultraviolet rays, electron beams, X-rays, α-rays, and γ-rays, and preferably include electron beams.

Examples of the irradiation method with electron beams include a method in which after extrusion molding as primary processing, the molded article is placed in an electron beam irradiation apparatus, and then is irradiated with electron beams. There is no specific limitation regarding the electron beam dose, but the dose is preferably 1 to 40 Mrad. If the dose of electron beams irradiated is lower than 1 Mrad, then crosslinking is difficult to progress. On the other hand, if the dose of electron beams irradiated is higher than 40 Mrad, then deterioration of the molded article tends to progress. The electron beam dose is more preferably 2 to 30 Mrad.

When a molded article obtained by primary molding requires secondary molding process such as stretching (uniaxial stretching or biaxial stretching) or heat molding, the molded article is preferably irradiated with electron beams during the period between the primary molding and the secondary molding. Examples of the electron beams that can be used in the crosslinking treatment usually include, but are not limited to, electron beams having 150 to 10000 KeV of energy, emitted from various electron beam accelerators such as a Cockcroft-Walton accelerator, a Van de Graaff accelerator, a resonant transformer accelerator, an insulated core transformer accelerator, a linear accelerator, a dynamitron accelerator, and a high-frequency cyclotron accelerator.

Furthermore, when performing the crosslinking treatment, it is preferable that a crosslinking aid is blended in advance with at least one of the composition (A) and the composition (B) constituting the multilayered pellets. Preferable examples of the crosslinking aid include polyfunctional allyl compounds and polyfunctional (meth)acrylic compounds, that is, allyl compounds and (meth)acrylic compounds having at least two functional groups. Specific examples thereof include triallyl cyanurate (TAC), triallyl isocyanurate (TAIC), pentaerythritol tetramethacrylate (PETMA), glutaraldehyde (GA), ethylene glycol dimethacrylate (EGDMA), diallyl maleate (DAM), dipropargyl maleate (DPM), dipropargyl monoallyl cyanurate (DPMAC), trimethylolpropane triacrylate (TMPTAT), tetraethylene glycol diacrylate (TEGDA), 1,6-hexamethyleneglycol diacrylate, tetramethylolmethane tetraacrylate, dipropargyl succinate, diallyl fumarate, and diallyl phthalate. Among these, triallyl cyanurate and triallyl isocyanurate are particularly preferable.

Among the molded articles produced from the multilayered pellets of the present invention, the multilayered molded article preferably has at least one layer that is formed by melt-molding the multilayered pellets and at least one layer made of a thermoplastic resin (X). Examples of the layer structure of the multilayered structure include, but are not limited to, Barrier/R, R/Barrier/R, Barrier/Ad/R, Reg/Barrier/R, R/Ad/Barrier/Ad/R, R/Reg/Ad/Barrier/Ad/Reg/R, when the mixed EVOH resin composition layer produced from the multilayered pellets of the present invention often used as a barrier material is taken as Barrier, an adhesive resin as Ad, a resin other than the barrier material as R, and a scrap recovered layer as Reg. Furthermore, in a case where layers comprising the thermoplastic resin (X) are provided on the both faces of the mixed EVOH resin composition layer produced from the multilayered pellets of the present invention, each of the layers of the thermoplastic resin (X) may be made of different types of resins from each other or may be made of the same resin. Furthermore, a recovered resin may be blended in a layer made of a resin other than the mixed EVOH resin composition derived from the multilayered pellets of the present invention. The number of each of the mixed EVOH resin composition layer and the thermoplastic resin (X) layer in a layered structure may be one, or in some cases, two or more.

There is no specific limitation regarding a method for producing a multilayered structure. Examples of the method include a method in which the thermoplastic resin (X) is melt-extruded onto a molded article (e.g., film and sheet) made of the mixed EVOH resin composition layer derived from the multilayered pellets of the present invention to form a layered structure; a method in which the mixed EVOH resin composition derived from the multilayered pellets of the present invention is melt-extruded onto a base material comprising the thermoplastic resin (X) to form a layered structure; a method in which the mixed EVOH resin composition derived from the multilayered pellets of the present invention and the thermoplastic resin (X) are coextrusion molded to form a layered structure; and a method in which a molded article produced from the multilayered pellets of the present invention and a film or sheet comprising the thermoplastic resin (X) are laminated using a known adhesive (adhesive containing, for example, an organic titanium compound, an isocyanate compound, or a polyester compound). Among these, the method is preferably employed in which the mixed EVOH resin composition derived from the multilayered pellets of the present invention and the thermoplastic resin (X) are coextrusion molded to form a layered structure.

As resins used for the thermoplastic resin (X) layer that is laminated together with the mixed EVOH resin composition layer derived from the multilayered pellets of the present invention, it is preferable to use at least one resin selected from the group consisting of polyolefin, polyamide, polyester, polystyrene, polyvinylidene chloride, polyvinyl chloride, polyacrylonitrile, thermoplastic polyurethane, and polycarbonate. Among these, polyolefin, polyamide, polystyrene, polyester, and thermoplastic polyurethane are preferably used. The following is a description concerning polyolefin, polyamide, and polyester, among the above-described materials.

There is no specific limitation regarding polyolefin used as the thermoplastic resin (X) in the present invention. Examples thereof include homopolymers of olefin and copolymers of olefin, such as linear low density polyethylene, low density polyethylene, medium density polyethylene, high density polyethylene, ethylene-vinyl acetate copolymer, ethylene-propylene copolymer, polypropylene, propylene-α-olefin copolymer (α-olefin having 4 to 20 carbon atoms), polybutene, and polypentene. In a case where polyolefin is a copolymer, examples of copolymer components other than α-olefin may include: vinyl compounds such as diolefin, N-vinylcarbazole, vinyl chloride, vinylidene chloride, styrene, acrylonitrile, and vinyl ether; unsaturated carboxylic acids such as maleic acid, acrylic acid, methacrylic acid ethacrylic acid, fumaric acid, and itaconic acid, their esters, their acid anhydrides, and compounds obtained by introducing a hydroxyl group or epoxy group thereto. For example, it is also possible to use various copolymers such as a copolymer of a graftable monomer and polyolefin, and an ionomer resin that is a product obtained by reacting an α-olefin-α,β-unsaturated carboxylic acid copolymer and an ionic metal compound. Furthermore, as the polyolefin, it is also possible to use chlorinated polyethylene and chlorinated polypropylene, for example. These polyolefin resins can be used alone or in combination of two or more. Among those listed above, polypropylene, polyethylene, an ethylene-propylene copolymer, and an ethylene-vinyl acetate copolymer are particularly preferably used.

Examples of the polyamide used as the thermoplastic resin (X) in the present invention include the following compounds: polycapramide (Nylon-6), poly-ω-aminoheptanoic acid (Nylon-7), poly-ω-aminononanoic acid (Nylon-9), polyundecanamide (Nylon-11), polylaurolactam (Nylon-12), polyethylene adipamide (Nylon-2,6), polytetramethylene adipamide (Nylon-4,6), polyhexamethylene adipamide (Nylon-6,6), polyhexamethylene sebacamide (Nylon-6,10), polyhexamethylene dodecamide (Nylon-6,12), polyoctamethylene adipamide (Nylon-8,6), polydecamethylene adipamide (Nylon-10,6), polydodecamethylene sebacamide (Nylon-12,10), caprolactam-lauryl lactam copolymer (Nylon-6/12), caprolactam-ω-aminononanoic acid copolymer (Nylon-6/9) caprolactam-hexamethylene adipamide copolymer (Nylon-6/6,6), lauryl lactam-hexamethylene adipamide copolymer (Nylon-12/6,6), hexamethylene adipamide-hexamethylene sebacamide copolymoer (Nylon-6,6/6,10), ethylene adipamide-hexamethylene adipamide copolymer (Nylon-2,6/6,6). caprolactam-hexamethylene adipamide-hexamethylene sebacamide copolymer (Nylon-6/6,6/6,10), polyhexamethylene isophthalamide, polyhexamethylene terephthalamide, and hexamethylene isophthalamide-terephthalamide copolymer. These polyamides can be used alone or in combination of two or more. Among these polyamides, polyamides containing a caproamide component (e.g., Nylon-6, Nylon-6,12, Nylon-6/12, Nylon-6/6,6, etc.) are preferable.

There is no specific limitation regarding the polyester used as the thermoplastic resin (X) in the present invention. Preferable examples thereof include polyethylene terephthalate), poly(butylene terephthalate). poly(ethylene terephthalate/isophthalate), and polylethylene glycol/cyclohexane dimethanol/terephthalate). Among these, poly(ethylene terephthalate) is particularly preferable. Furthermore, as the polyester, it is possible to use polyester that contains a copolymer component such as: diols (e.g., ethylene glycol, butylene glycol, cyclohexanedimethanol, neopentyl glycol, or pentanediol, etc.); or dicarboxylic acids (e g., isophthalic acid, benzophenone dicarboxylic acid, diphenylsulfone dicarboxylic acid, diphenylmethane dicarboxylic acid, propylene bis(phenyl carboxylic acid), diphenyl oxide dicarboxylic acid, oxalic acid, malonic acid, succinic acid, glutaric acid, adipic acid, pimelic acid, suberic acid, azelaic acid, sebacic acid, and diethyl succinic acid).

It is also preferable to use an elastomer as the thermoplastic resin (X) There is no specific limitation regarding the type of the elastomer Preferable examples thereof include a polyurethane elastomer, a polystyrene elastomer, a polyamide elastomer, a polyester elastomer, a polyolefin elastomer, and an elastomer made of a copolymer of a vinyl aromatic compound and a conjugated diene compound. Among these (i) polyurethane elastomer, (ii) polyolefin elastomer and (iii) elastomer made of a copolymer of a vinyl aromatic compound and a conjugated diene compound are described below.

Examples of the polyurethane elastomer (i) used as the thermoplastic resin (X) include, but are not limited to, a polyurethane elastomer obtained from high-molecular weight diol and/or low-molecular weight diol, and organic diisocyanate as raw materials. Hereinafter, specific examples of these raw materials are described.

The high-molecular weight diol is a diol of high-molecular weight obtained by polycondensation, addition polymerization (e.g., ring-opening polymerization), polyaddition, or the like. Typical examples of the high-molecular weight diol include polyester diol, polyether diol, polycarbonate diol, and their cocondensate (e.g., polyester and ether diol). These materials can be used alone or in combination of two or more.

Among these, as the polyester diol, it is possible to use polyester diol obtained from an aliphatic diol such as ethylene glycol, propylene glycol, 1,5-pentanediol, or a mixture thereof, and aliphatic dicarboxylic acid or aromatic dicarboxylic acid such as glutaric acid, adipic acid, terephthalic acid or a mixture thereof. Alternatively, it is preferable to use polylacton diol such as polycaprolactone glycol, polypropiolactone glycol, or polyvalerolactone glycol. Furthermore, as the polyether diol, it is preferable to use polyalkylene ether diol such as polyethylene ether glycol. polytetramethylene ether glycol, or polyhexamethylene ether glycol. Furthermore, as the polycarbonate diol, it is preferable to use polycarbonate diol obtained by condensation polymerization in which diphenyl carbonate or phosgene reacts with alhphatic diol having 2 to 12 carbon atoms such as 1,4-butanediol, 1,5-pentanediol, 1,6-hexanediol, 1,8-octanediol and 1,10-decanediol, or a mixture thereof.

The average molecular weight of the high-molecular weight diol is 500 to 3000, and preferably 500 to 2500. If the average molecular weight is too small, then compatibility with organic diisocyanate is too good, so that elasticity of resultant polyurethane is poor. On the other hand, if the average molecular weight is too large, the compatibility with organic diisocyanate is poor. Thus mixing of these materials in a polymerization process cannot be performed well, so that aggregates of gelled materials are generated, and stable polyurethane cannot be obtained.

Examples of the low-molecular weight diol as a raw material for polyurethane elastomer include aliphatic diol, alicyclic diol, or aromatic diol having a molecular weight of less than 500, such as ethylene glycol. propylene glycol, 1,4-butanediol, 1,5-pentanediol, 3-methylpentane glycol, 1,6-hexanediol, and 1,4-bishydroxyethylbenzene. These materials can be used alone or in combination of two or more.

Examples of the organic diisocyanate as a raw material for polyurethane elastomer include aromatic diisocyanate, alicyclic diisocyanate, or aliphatic diisocyanate, such as 4,4-diphenylmethane diisocyanate, tolylene diisocyanate, 1,3-bis(isocyanatomethyl)benzene, 1,4-bis(isocyanatomethyl)benzene, 1,3-bis(isocyanatomethyl)cyclohexane, 1,4-bis(isocyanatomethyl)cyclohexane, 4,4'-dicyclohexylmethane diisocyanate, and isophorone diisocyanate. These organic diisocyanates can be used alone or in combination of two or more.

The nitrogen content of the polyurethane elastomer (i) obtained from these raw materials is determined by appropriately selecting the ratio of the raw materials, that is the high-molecular weight diol, the low-molecular weight diol, and the organic diisocyanate. In practice, the nitrogen content is preferably 1 to 7%. When the polyurethane elastomer is prepared, an appropriate catalyst for accelerating the reaction of the organic diisocyanate and the diols is employed if necessary. During or after the preparation of the polyurethane elastomer, various additives such as a colorant, filler, an antioxidant, and an ultraviolet absorber, and a lubricant may be added depending on the purpose.

There is no specific limitation regarding the polyolefin elastomer (ii) used as the thermoplastic resin (X) in the present invention. Preferable examples thereof include an ethylene-propylene copolymer elastomer (EPR). There is no specific limitation regarding the ethylene-propylene copolymer, and it may be a random copolymer of ethylene and propylene, or a block copolymer of ethylene and propylene, for example. Regarding the content of these components in each copolymer, one component is preferably in a ratio of at least 10 wt % or more, and more preferably 20 wt % or more, because it is preferable that the component has sufficient flexibility.

There is no specific limitation regarding the elastomer (iii) made of a copolymer of a vinyl aromatic compound and a conjugated diene compound, used as the thermoplastic resin (X) in the present invention. Examples of the vinyl aromatic compound constituting this elastomer include: styrenes such as styrene, α-methylstyrene, 2-methylstyrene, 4-methylstyrene, 4-propylstyrene, 4-t-butylstyrene, 4-cyclohexylstyrene. 4-dodecylstyrene, 2-ethyl-4-benzylstyrene, 4-(phenyl butyl) styrene, 2,4,6-trimethylstyrene, monofluorostyrene, difluorostyrene, monochlorostyrene, dichlorostyrene, methoxystyrene, and t-butoxystyrene: vinyl group-containing aromatic compounds such as vinylnaphthalenes (e.g., 1-vinylnaphthalene and 2-vinylnaphthalene); and vinylene group-containing aromatic compounds such as indene and acenaphthylene. Vinyl aromatic monomer units derived from these compounds and existing in the copolymer may be one type, or two or more types. It should be noted that the units are preferably derived from styrene.

There is no specific limitation regarding the conjugated diene compound constituting the copolymer. Examples of the conjugated diene compound include butadiene, isoprene, 2,3-dimethylbutadiene, pentadiene, and hexadiene. The conjugated diene compound may be partially or completely hydrogenated. Examples of the copolymer containing the partially hydrogenated conjugated diene compound include hydrogenated compounds, each of which is derived from styrene-ethylene butylene-styrene triblock copolymer (SEBS), styrene-ethylene/propylene-styrene triblock copolymer (SEPS), or styrene-conjugated diene copolymer.

Among the various elastomers described above, the polyurethane elastomer (i) is preferably used. The reason for this is that excellent layer adhesions is obtained when the multilayered structure is prepared containing the mixed EVOH resin composition layer derived from the multilayered pellets of the present invention and a layer derived from this elastomer.

As described above, the multilayered structure having the mixed EVOH resin composition layer and the thermoplastic resin (X) layer is preferably produced by coextrusion molding using the multilayered pellets and the thermoplastic resin (X). At this time, depending on the type of the thermoplastic resin that is used, the mixed EVOH resin composition layer and the thermoplastic resin (X) layer may be layered and adhered using an adhesive resin.

In this case, the adhesive resin is preferably an adhesive resin made of a carboxylic acid modified polyolefin. Herein, the carboxylic acid modified polyolefin refers to a modified olefin polymer containing a carboxyl group, obtained by chemically introducing (binding by addition reaction or grafting reaction, for example) an ethylenically unsaturated carboxylic acid or anhydride thereof to an olefin polymer.

Herein, the olefin polymer refers to a polyolefin such as polyethylene (low pressure polyethylene, medium pressure polyethylene, or high pressure polyethylene) linear low density polyethylene, polypropylene, or polybutene, and a copolymer of an olefin and a comonomer that can be copolymerized with the olefin (e.g., vinyl ester, unsaturated carboxylic acid ester, etc.), and the like. Examples of the copolymer include an ethylene-vinyl acetate copolymer, and an ethylene-ethyl acrylate copolymer. Among these, linear low density polyethylene, an ethylene-vinyl acetate copolymer (having a vinyl acetate content of 5 to 55 wt %), and an ethylene-ethyl acrylate copolymer (having an ethyl acrylate content of 8 to 35 wt %) are preferable, and linear low density polyethylene and an ethylene-vinyl acetate copolymer are particularly preferable.

Examples of the ethylenically unsaturated carboxylic acid or anhydride thereof include an ethylenically unsaturated monocarboxylic acid and its ester, an ethylenically unsaturated dicarboxylic acid and its monoester and diester, and their anhydrides. Among these an anhydride of ethylenically unsaturated dicarboxylic acid is preferable. More specifically, it is possible to use maleic acid, fumaric acid, itaconic acid, maleic anhydride, itaconic anhydride, monomethyl maleate, monoethyl maleate, diethyl maleate, monomethyl fumarate, and the like. Among these, maleic anhydride is preferable.

The amount of addition or grafting (i.e., modification degree) of the ethylenically unsaturated carboxylic acid or its anhydride with respect to the olefin polymer is 0.0001 to 15 parts by weight, and preferably 0.001 to 10 parts by weight, with respect to 100 parts by weight of the olefin polymer. The addition reaction or the grafting reaction of the ethylenically unsaturated carboxylic acid or anhydride thereof to the olefin polymer is conducted by, for example, radical polymerization in the presence of a catalyst (e.g., peroxide) in a solvent (e.g. xylene). The melt flow rate (MFR) of the thus obtained carboxylic acid modified polyolefin, measured at 190° C. under a load of 2160 g, is preferably 0.2 to 30 g/min, and more preferably 0.5 to 10 g/min. These adhesive resins can be used alone or in combination of two or more.

In a case where a multilayered structure having the mixed EVOH resin composition layer and the thermoplastic resin layer is formed by each melt-kneading the multilayered pellets of the present invention and the thermoplastic resin (X) and performing coextrusion, the following advantage is obtained compared with molding using ordinary EVOHs. One advantage is that since the mixed EVOH resin composition layer derived from the multilayered pellets of the present invention has excellent barrier properties, transparency, stretching properties, flexibility and bending resistance, the multilayered molded article containing this layer also can be provided with these excellent properties.

Another advantage is based on the fact that the modified EVOH (b) used in the present invention has a lower melting point than that of ordinary EVOHs. Although the melting point of the modified EVOH (b) varies depending on the content of the unit of Formula (I) above and the like, the melting point is lower than that of ordinary unmodified EVOHs.

EVOHs are often used as a layered article including a polyolefin layer. This layered article is often produced by coextrusion molding. However, the melting point of an EVOH having an ethylene content of 5 to 55 mol % is usually higher than that of resins such as polyolefin. Thus, in a conventional process, when melt-molding the EVOH and polyolefin by coextrusion molding, it is necessary to perform the molding at a temperature higher than the melting point of the EVOH. In other words, conventionally, coextrusion molding was performed at a molding temperature that is not necessarily optimum for polyolefin.

On the other hand, the multilayered pellets of the present invention can be coextrusion molded at a molding temperature that is closer to the optimum molding temperature of polyolefin. In this manner, coextrusion molding can be conducted in a wide range of temperature, so that the viscosity matching of polyolefin and the mixed EVOH resin composition derived from the multilayered pellets of the present invention can be adjusted more easily, and thus a coextrusion molded article can be obtained under more preferable operation conditions. The present invention is significant also from this viewpoint.

There is no specific limitation regarding a method for producing a multilayered structure having the mixed EVOH resin composition layer and the thermoplastic resin layer, by melt-kneading each of the multilayered pellets of the present invention and the thermoplastic resin (X) and performing coextrusion. Preferable examples of the method include the multi-manihold method, the feed block method, and the multi-slot die method. With these molding methods, multilayered films, multilayered sheets, multilayered pipes, multilayered hoses, multilayered profile-molded articles, and the like are molded. Furthermore, multilayered films and multilayered bottles can be obtained also using, for example, blown film coextrusion molding or coextrusion blow molding.

Various molded articles (e.g., films, sheets, tubes, and bottles) can be obtained by performing secondary processing on the thus obtained coextruded multilayered structure. Examples of the molded articles include:

(1) a multilayered costretched sheet or a film obtained by stretching a multilayered structure (e.g., a sheet or a film) in a uniaxial direction or biaxial direction, or stretching the multilayered structure in a biaxial direction and heat-treated;

(2) a multilayered rolled sheet or a film obtained by rolling a multilayered structure (e.g., a sheet or a film):

(3) a multilayered tray or a cup-shaped container obtained by subjecting a multilayered structure (e.g., sheet or film) to a molding with heat such as vacuum molding, pressure forming, or vacuum pressure molding; and (4) a bottles or a cup-shaped container obtained from a multilayered structure (e.g., a pipe) by stretch blow molding or the like.

There is no specific limitation regarding such secondary processing methods, and it is also possible to apply known secondary processing methods (e.g., blow molding) other than those listed above.

The molded articles produced from the multilayered pellets of the present invention are excellent in barrier properties, transparency, stretching properties, flexibility, and bending resistance, and thus they can be used in various applications. Preferable examples thereof include flexible films, flexible packaging materials, heat molded containers, blow molded articles (e.g., multilayered coextrusion blow molded containers and multilayered coinjection blow molded containers), heat shrinkable films (e.g., skin packaging films), hoses, and balloons. Among these, flexible packaging materials (e.g., flexible pouches and tubes) and flexible films are preferable in order to sufficiently exert the effects of the bending resistance.

Furthermore, it is also preferable to use, a multilayered structure obtained by layering the mixed EVOH resin composition layer derived from the multilayered pellets of the present invention and the thermoplastic resin (X) layer for wall paper or a decorative sheet. Since the EVOH has excellent antistaining properties and functions of preventing bleed-out of a plasticizer, the multilayered structure containing the EVOH layer is preferably used for wall paper. Usually, wall paper is often stored in a rolled state, for example, when stored during transportation or in a warehouse. When wall paper is often bent due to repeated transportations or the like, wrinkles are generated in the EVOH layer by folding, or in an extreme case, whitening may be generated, resulting in a poor external appearance. However, the molded article produced from the multilayered pellets of the present invention has excellent flexibility and bending resistance, while keeping functions of preventing bleed-out of the plasticizer. and thus this molded article can be very suitable for this application.

Furthermore, the flexible films produced from the multilayered pellets of the present invention are excellent in antistaining properties, flexibility, and bending resistance as described above, and thus it is preferable to use the flexible films as book covers and the like by layering the flexible films together with an artificial leather, for example. It is also preferable to use the flexible films for outside covers of books or covers of pocket notebooks, for example.

Furthermore, multilayered pipes excellent in crack resistance can be obtained by forming the multilayered structure into pipes, wherein the multilayered structure comprises the mixed EVOH resin composition layer derived from the multilayered pellets of the present invention and the thermoplastic resin (X) layer. In a preferred embodiment, each of the multilayered pipes is made of a layered article having an intermediate layer made of the mixed EVOH resin composition layer and inner and outer layers made of polyolefin. The multilayered pipes are preferably used in particular as fuel pipes or hot water circulating pipes. The fuel pipes also can be used for so-called fuel lines, through which fuel is transported from oil fields and the like, as well as used for the fuel pipes for automobiles. In such an application, these multilayered pipes are usually connected to each other using a connector. At the time of connection, the diameter of the end portion of the pipe is often enlarged using a special expansion tool, gradually in several discrete operations.

In this process, in a conventional multilayered pipe having an ordinary EVOH as an intermediate layer, a crack may be generated at the portion where the diameter of the multilayered pipe is enlarged. In particular, during an operation in an environment where the outside air temperature is very low, such as a region where floor heating pipes are installed, a large crack may be generated in the layer comprising the EVOH. This crack may lower oxygen barrier properties at the portion where the multilayered pipes are connected to each other. However, the mixed EVOH resin composition layer derived from the multilayered pellets of the present invention is excellent in flexibility, and thus, generation of crack can be effectively suppressed in the layer comprising the resin composition in the process of connecting the pipes.

Also, the multilayered pipes are preferably used as fuel pipes. In this case, the fuel pipes are preferably used in particular as fuel pipes for automobiles, which supply fuel from a fuel tank to an engine. In such an embodiment, vibrations of the engine and vibrations during the travel of the automobile, continuously apply load to the fuel pipes, and thus a crack and the like are easily generated in the barrier layer. However, the mixed EVOH resin composition layer derived from the multilayered pellets of the present invention is excellent in flexibility, and thus a crack can be effectively suppressed in the layer comprising the resin composition, even in the use for the fuel pipes.

From the viewpoint as described above, it is very advantageous to use the multilayered structure containing the mixed EVOH resin composition layer derived from the multilayered pellets of the present invention for multilayered pipes. In particular, the multilayered structure is preferably used for fuel pipes or hot water circulation pipes.

Furthermore, it is also preferable to use the multilayered structure containing the mixed EVOH resin composition layer derived from the multilayered pellets of the present invention for multilayered hoses. Hoses are more flexible than pipes, and thus it is very advantageous to use the multilayered structure for the multilayered hoses, wherein the multilayered structure comprises the mixed EVOH resin composition layer derived from the multilayered pellets of the present invention, and is excellent in flexibility. The multilayered structure is particularly preferably used for fuel hoses.

Furthermore, in a case where the multilayered structure containing the mixed EVOH resin composition layer derived from the multilayered pellets of the present invention is a multilayered blow molded article. excellent shock resistance can be obtained. The multilayered blow molded article is preferably used for multilayered coextrusion blow molded containers. The multilayered blow molded containers preferably comprises an intermediate layer made of the resin composition and inner and outer layers made of polyolefin. As the polyolefin, polyethylene or polypropylene is particularly preferably used.

Furthermore, the multilayered blow molded containers are preferably used for fuel containers for automobiles or fuel container for motor bikes. In a case where the multilayered coextrusion blow molded containers are used for fuel containers, high density polyethylene is preferably used as the polyolefin. The high density polyethylene can be selected as appropriate from among those commercially available. Among these, the density of the high density polyethylene is preferably 0.95 to 0.98 g/cm$^3$, and more preferably 0.96 to 0.98 g/cm$^3$, in view of rigidity, shock resistance, moldability, draw down resistance, gasoline resistance and the like. The melt flow rate (MFR) of the high density polyethylene used for the inner and outer layers of the multilayered fuel containers is preferably 0.01 to 0.5 g10 min (190° C., 2160 g load), and more preferably 0.01 to a 0.1 g/10 min (190° C., 2160 g load).

Another preferred embodiment of the multilayered blow molded containers formed by layering the EVOH resin composition layer derived from the multilayered pellets of the present invention and the thermoplastic resin (X) layer is directed to a coinjection stretching blow molded container.

In particular, a multilayered container containing at least one EVOH resin composition layer derived from the multilayered pellets of the present invention and at least one polypropylene layer is preferably used. Examples of the polypropylene used herein include homopolypropylene, as well as a random copolymer and a block copolymer made from propylene and another olefin compound such as ethylene. Among these, an ethylene-containing copolymer is preferable in view of the transparency and the external appearance of the molded article. The melt index of the polypropylene is preferably 0.1 to 100 g/10 min (230° C., 2160 g load), more preferably 0.2 to 50 g/10 min, and even more preferably 0.5 to 20 g/10 min.

Regarding the conditions of injection molding, the molding temperature of the polypropylene is preferably 180 to 250° C., and more preferably 200 to 250° C., in view of the fluidity of molten polypropylene, and the external appearance and the strength of the container that is to be obtained. As the production conditions when producing a multilayered parison having the polypropylene layer and the EVOH resin composition layer derived from the multilayered pellets of the present invention, and the production conditions for stretch blow molding the multilayered parison, it is possible to apply the conditions for producing a coinjection blow molded container having a polyester layer and an EVOH resin composition layer, described in Japanese Laid-Open Patent Publication No. 2001-277341.

The thus obtained coinjection stretching blow molded container having the polypropylene layer and the EVOH resin composition layer derived from the multilayered pellets of the present invention is excellent in aroma retentivity, organic solvent resistance, and delamination resistance. This multilayered container is suitable for storing various contents for a long period of time, and is useful, for example, as a container for storing various drinks such as tea that is to be filled at a high temperature, foods, cosmetics, and blood samples.

The obtained various molded articles described above also can be pulverized and molded again for reuse, and thus the recycling efficiency is excellent.

EXAMPLES

Hereinafter, the present invention will be described in more detail by way of examples, but is not limited thereto.

The EVOH (a), the modified EVOH (b), and the EVOH resin composition are analyzed using the following methods (1) Ethylene Content and Degree of Saponification of EVOH (a)

The ethylene content and the degree of saponification of the EVOH (a) were calculated based on the spectrum obtained by $^1$H-NMR (nuclear magnetic resonance) measured using a deuterated dimethyl sulfoxide as a solvent ("JNM-GX-500 Model" manufactured by JEOL Ltd. was used for measurement).

(2) Intrinsic Viscosity of EVOH (a)

First, 0.20 g of dry sample pellets comprising the dry EVOH (a) were weighed precisely, put into 40 ml of water-containing phenol (water/phenol=15/85: weight ratio) and dissolved by heating the mixture at 60° C. for 3 to 4 hours. The temperature of this solution was lowered to 30° C., and measurement was performed using an Ostwald viscometer (t0=90 seconds). The intrinsic viscosity [η] was obtained using the equations below.

$$[\eta] = (2 \times (\eta sp - ln \eta rel))^{1/2}/C \ (L/g)$$

ηsp (specific viscosity)=t/t0−1

ηrel (relative viscosity)=t=t0

C: EVOH concentration (g/L)

t0: time (second) taken for blank (water-containing phenol) to pass through the viscometer t: time (second) taken for water-containing phenol solution into which the sample has been dissolved to pass through the viscometer.

(3) Quantification of Acetic Acid in EVOH (a)

First, 20 g of dry sample pellets of the EVOH (a) were put into 100 ml of ion exchanged water. Then the mixture was heated for extraction at 95° C. for 6 hours. The resultant extract was neutralized with 1/50N NaOH using phenolphthalein as an indicator, and the acetic acid in the EVOH(c) was quantified (4) Quantification of Na Ions, K Ions, Mg Ions, and Ca Ions in EVOH (a) and Modified EVOH (b)

First, 10 g of dry sample pellets of the EVOH (a) or the modified EVOH (b) were put into 50 ml of 0.01N hydrochloric acid aqueous solution, and the mixed solution was stirred at 95° C. for 6 hours. The resultant aqueous solution was quantitatively analyzed through ion chromatography to determine the contents of Na, K, Mg, and Ca ions. As the column, ICS-C25 manufactured by Yokogawa Electric Corp was used. As the eluent, an aqueous solution containing 5.0 mM of tartaric acid and 1.0 mM of 2,6-pyridinedicarboxylic acid was used. The quantification was conducted based on the calibration curves prepared by using aqueous solutions of sodium chloride, potassium chloride, magnesium chloride, and calcium chloride, respectively.

(5) Quantification of Phosphoric Acid Ions and Trifluoromethane Sulfonic Acid Ions in EVOH (a) and Modified EVOH (b)

First, 10 g of dry sample pellets of the EVOH (a) or the modified EVOH (b) were put into 50 ml of 0.01N hydrochloric acid aqueous solution and the mixture was stirred at 95° C. for 6 hours. The resultant aqueous solution was quantitatively analyzed through ion chromatography to determine the contents of phosphoric acid ions and trifluoromethane sulfonic acid ions. As the column ICS-A23 manufactured by Yokogawa Electric Corp. was used. As the eluent, an aqueous solution containing 2.5 mM of sodium carbonate and 1.0 mM of sodium hydrogencarbonate was used. The quantification was conducted based on the calibration curves prepared by using aqueous solutions of sodium dihydrogen phosphate and sodium trifluoromethanesulfonate, respectively.

(6) Quantification of Zinc Ions and Yttrium Ions in Modified EVOH (b)

First, 10 g of dry sample pellets of the modified EVOH (b) were put into 50 ml of 0.01N hydrochloric acid aqueous solution and the mixture was stirred at 95° C. for 6 hours. The resultant aqueous solution was analyzed through ICP emission spectrometry. As the apparatus, Optima 4300 DV manufactured by PerkinElmer, Inc. The measurement wavelength was 206.20 nm in the measurement of zinc ions, and was 360.07 nm in the measurement of yttrium ions. The quantification was conducted based on the calibration curves prepared by using commercially available standard solutions of zinc and yttrium, respectively.

(7) Melting Points of EVOH (a) and Modified EVOH (b)

The melting points of the EVOH (a) and the modified EVOH (b) were measured following the method of JIS K7121, using a differential scanning calorimeter (DSC) RDC220/SSC5200H Model (manufactured by Seiko Instruments Inc.). For temperature calibration, indium and lead were used.

(8) Melt Flow Rates (MFPR) of EVOH (a), Modified EVOH (b), and Resin Composition The melt flow rate was measured using a melt indexer, L244 (manufactured by Takara Industry). More specifically, pellets of a resin to be measured (i.e., the EVOH, the modified EVOH (b), or the EVOH resin composition) were put into a cylinder having an inner diameter of 9.55 mm and a length of 162 mm, and were molten therein at 190° C. A load was uniformly applied to the molten resin with a plunger having a weight of 2160 g and a diameter of 9.48 mm, by which the resin was extruded through an orifice having a diameter of 2.1 mm that was provided at the center of the cylinder. The flow rate (g/10 min) of the extruded resin was taken as the melt flow rate (MFR).

Synthesis Example 1

Preparation of Modified EVOH

First, 28 parts by weight of acetylacetonatozinc monohydrate was added to 957 parts by weight of 1,2-dimethoxyethane, and thus a mixture was obtained. Then, 15 parts by weight of trifluoromethanesulfonic acid was added to the mixture with stirring, and thus, a solution containing a catalyst was obtained. Namely, a solution containing acetylacetonatozinc monohydrate and trifluoromethanesulfonic acid (as a catalyst) in a molar ratio of 1:1 was obtained.

Then, 100 parts by weight of water-containing pellets made of an ethylene-vinyl alcohol copolymer was provided. The amount of water contained in the pellets is 130 parts by weight with respect to 100 parts by weight (dry weight)of the total resin in the pellets. The ethylene-vinyl alcohol copolymer has an ethylene content of 32 mol %, a degree of saponification of 99.6%, and an intrinsic viscosity of 0.0882 L/g. The pellets were immersed in 370 parts by weight of an aqueous solution containing 0.1 g/L of acetic acid and 0.044 g/L of potassium dihydrogen phosphate, and the resultant mixture was stirred at 25° C. for 6 hours. The obtained pellets were dried at 105° C. for 20 hours, and thus dry EVOH pellets were obtained These dry EVOH pellets had a potassium content of 8 ppm (in terms of the metal element), an acetic acid content of 53 ppm, a content of a phosphorus compound of 20 ppm (in terms of the phosphoric acid radical), and a content of an alkaline-earth metal salt (Mg salt and Ca salt) of 0 ppm. Furthermore, the MFR of the dry pellets was 8 g/10 min (190° C., 2160 g load). The thus obtained EVOH pellets were employed as EVOH (a). As the epoxy compound (c), epoxypropane was used.

A TEM-35BS extruder (37 mm $\phi$, L/D=2.5) manufactured by Toshiba Machine Co, Ltd. was provided, the configuration of screw elements as shown in FIG. 1 was constructed, and vents and injection ports were arranged as shown in FIG. 1. A barrel C1 was cooled with water, barrels C2 to C15 were set at 200° C., and an operation was performed at screw rotational speed of 250 rpm. The EVOH (a) was added at a rate of 11 kg/hr from a resin feed port of C1, and the internal pressure of a vent 1 was reduced to 60 mmHg. Epoxypropane and the catalyst solution were mixed and then fed (pressure in feeding: 3 MPa) from an injection port 1 of C8 such that the epoxypropane was added at a rate of 1.5 kg/hr and that the catalyst solution was added at a rate of 0.22 kg/hr. Next, unreacted epoxypropane was removed under atmospheric pressure from a vent 27 and then an aqueous solution of catalyst inactivator (8.2 wt % aqueous solution of trisodium ethylenediaminetetraacetate trihydrate) was added at a rate of 0.11 kg/hr from an injection port 2 of C13.

In the melt-kneading, the ratio of the monovalent epoxy compound (c) added was 13.6 parts by weight with respect to 100 parts by weight of the EVOH (a). The ratio of the catalyst with respect to the weight of the EVOH (a) was 2 m μmol/g in terms of the number of moles of metal ions The ratio (I/H) of the number of moles (I) of the catalyst inactivator (trisodium ethylenediaminetetraacetate trihydrate) with respect to the number of moles (H) of the metal ions contained in the catalyst was 1.

The internal pressure of a vent 3 was reduced to 20 mmHg, water was removed, and thus the modified EVOH (b) was obtained. The MFR of the obtained modified EVOH (b) was 7 g/10 min (190° C., 2160 g load), and the melting point thereof was 132° C. The zinc ion content was 120 ppm (1.9 μmol/g), the content of alkali metal salts was 138 ppm (5.9 μmol/g) [sodium: 130 ppm (5.7 μmol/g), potassium: 8 ppm (0.2 μmol/g)] in terms of the metal element, and the content of trifluoromethanesulfonic acid ions was 280 ppm (1.9 μmol/ g). The content of alkali metal ions was 3.1 times (mole ratio) as large as the content of trifluoromethanesulfonic acid ions.

The chemical structure of the thus obtained modified EVOH (b) that had been modified with epoxypropane was determined by performing the NMR measurement after trifuoroacetylating the modified EVOH (b) according to the following procedure.

Figure 2:
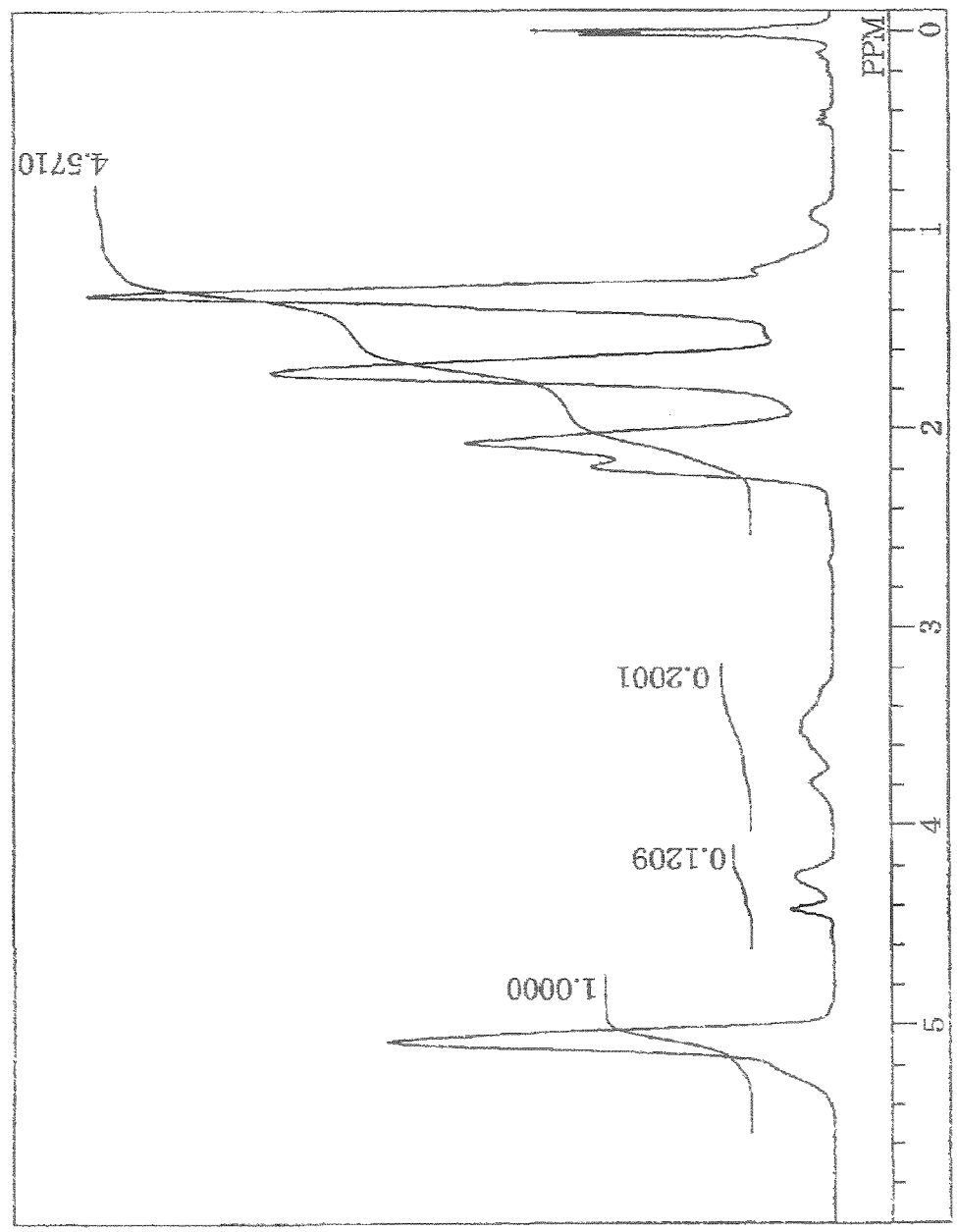
FIG. 2 is an $^1$H-NMR chart of the modified EVOH (b) obtained in Synthesis Example 1.

The obtained modified EVOH (b) was pulverized to have a particle size of 0.2 mm or less, and then 1 g of this power was put in a recovery flask (100 ml), 20 g of methylene chloride and 10 g of trifluoroacetic anhydride were added thereto, and the mixture was stirred at room temperature. At 1 hour after the beginning of stirring, the modified EVOH (b) was completely dissolved. The resultant solution was stirred for additional 1 hour, and the solvent was removed using a rotary evaporator. The obtained trifluoroacetylated modified EVOH (b) was dissolved at a concentration of 2 g/L into a mixed solvent of deuterated chloroform and trifluoroacetic anhydride (deuterated chloroform/trifluoroacetic anhydride=2/1 (weight ratio)), and 500 MHz $^1$H-NMR measurement was conducted using tetramethylsilane as an internal standard. FIG. 2 shows the NR chart Regarding the chemical structure of the modified EVOH (b) that had been modified with epoxypropane, the contents of the following units were determined.

w: ethylene content (mol %)
x: content (mol %) of unmodified vinyl alcohol unit
y: content (mol %) of unit expressed by Formula (I-1) below
z: content (mol %) of unit expressed by Formula (I-2) below

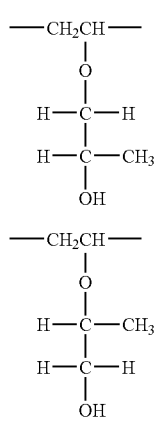

The symbols w to z satisfy Formulae (2.1) to (2.4) below.

$$4w+2x+5y+5z=A \quad (2.1)$$

$$3y+2z=B \quad (2.2)$$

$$2z=C \quad (2.3)$$

$$x+y=D \quad (2.4)$$

where the symbols A to D in Formulas (2.1) to (2.4) above are each an integral value of the area beneath the signal peak in the following range in the $^1$H-NMR chart of the modified EVOH (b):

A: integral value of the area beneath the signal peak from δ1.1 to 2.5 ppm;

B: integral value of the area beneath the signal peak from δ3.1 to 4 ppm;

C: integral value of the area beneath the signal peak from δ4.1 to 4.6 ppm; and

D: integral value of the area beneath the signal peak from δ4.8 to 5.6 ppm.

The ethylene content of the modified EVOH (b) can be obtained based on Formulae (2.1) to (2.4) above in the following manner.

Ethylene content (mol %) of modified EVOH (b)

$$=\{w/(w+x+y+z)\}\times 100$$

$$=\{(2A-2B-3C-4D)/(2A-2B+C+4D)\}\times 100$$

Similarly, the content of the unit of Formula (I) of the modified EVOH (b) can be obtained in the following manner.

Content (mol %) of unit of Formula (I) of modified EVOH (b)

$$=\{(y+z)/(w+x+y+z)\}\times 100$$

$$=\{(8B+4C)/(6A-6B+3C+12D)\}\times 100$$

The ethylene content of the modified EVOH (b) produced in Synthesis Example 1 was 32 mol % and the content of the unit of Formula (I) was 5.5 mol %. The method for producing the obtained modified EVOH (b) and its properties are summarized in Table 1.

TABLE 1

| | Raw material | | | Reaction conditions | | | Modified EVOH | | |
|---|---|---|---|---|---|---|---|---|---|
| | MFR of EVOH (a) (g/10 min) | Epoxy compound (c) | Amount[1]) of epoxy compound (c) (parts by weight) | Metal ion in catalyst | Melt-kneading temperature (° C.) | Ethylene content (mol %) | Content of unit (I) (mol %) | Melting point (° C.) | MFR (g/10 min) |
| Synthesis Example 1 | 8 | Epoxypropane | 13.6 | Zinc ion | 200 | 32 | 5.5 | 132 | 7 |

[1])Amount of epoxy compound (c) in parts by weight with respect to 100 parts by weight of EVOH (C)

(Preparation of EVOH Pellets or EVOH Resin Composition Pellets)

EVOHs 1 to 5 having properties or components listed in Table 2 were provided as EVOH pellets or EVOH resin composition pellets, and used as raw materials for multilayered pellets in the examples and the comparative examples below. EVOH 4 and EVOH 5, which were EVOH resin composition pellets, were prepared in the following manner.

(i) Preparation of EVOH 4

Predetermined amounts of EVOH and the modified EVOH (b) listed in Table 2 were dry-blended. The blend was extruded into pellets with a 30 mm φ twin screw extruder (TEX-30SS-30CRW-2V, manufactured by Japan Steel Works, Ltd.) at an extrusion temperature of 200° C. a screw rotational speed of 300 rpm, and an extruded resin amount of 25 kg/hour. These pellets were dried with hot air at 80° C. for 16 hours, and thus, resin composition pellets were obtained.

(ii) Preparation of EVOH 5

The EVOH listed in Table 2, and polyethylene glycol (trade name: PEG-600) manufactured by Sanyo Chemical Industries, Ltd, serving as the plasticizer (d), were employed. Using the 30 mm φ twin screw extruder (TEX-30SS-30CRW-2V, manufactured by Japan Steel Works, LTD.), the EVOH was kneaded in the extruder at a temperature of 200° C. and a screw rotational speed of 300 rpm, together with polyethylene glycol that was side-fed using a gear pump so that it would be contained in a ratio of 10 wt % of the total weight of the obtained mixture. The mixture was extruded into pellets at an extrusion temperature of 200° C. and an extruded resin amount of 25 kg/hour. These pellets were dried with hot air at 80° C. for 16 hours, and thus, resin composition pellets were obtained (Measurement of Heat Sealing Temperature)

The heat sealing temperatures of the EVOHs 1 to 5 serving as raw materials for multilayered pellets were measured in the following manner.

From the EVOHs 1 to 5 listed in Table 2, single layered films each having a thickness of 20 μm were formed using a film-forming apparatus comprising a 40 φ extruder (PLABOR GT-40-A manufactured by PLABOR Co, Ltd) and a T-die under the following extrusion conditions.

Model: single screw extruder (non-vent type)

L/D: 24

Inner diameter of extruder: 40 mm φ

Screw: full-flighted type single threaded screw, nitrided steel on surface

Screw rotational speed: 40 rpm

Die: coat-hanger die with width of 550 mm

Lip gap: 0.3 mm

Cylinder and die temperature setting: C1/C2/C3/adaptor/die =180° C./200° C./210° C./210° C./210° C.

Then, 50 μm of unstretched polypropylene film was dry-laminated on a surface of each of the obtained single layered film using an adhesive AD-335A (Toyo-Morton, Ltd.), and thus a multilayered film was produced. The heat sealing temperatures of these film was measured by the following method. The evaluation results are summarized in Table 2.

Method for Measuring Heat Sealing Temperature:

The thus obtained multilayered film was cut into a length of 100 mm and a width of 17 mm. Two pieces of the multilayered films were layered so that each of their EVOH layers was come into contact with each other, and heat sealed using a YAA HEAT SEALER manufactured by YASUDA-SEIKI-SEISAKUSHO, LTD, at a pressure of 1 kgf/cm² for 1 second. By changing the sealing temperature, a plurality of heat-sealed films were obtained. These heat-sealed films were cut into a width of 15 mm, and the T-peel strength was measured using an autograph manufactured by SHIMADZU CORPORATION, at a tensile speed of 250 mm/min. A graph was prepared by plotting the peel strength with respect to the temperature at which heat-sealing was performed. The temperature corresponding to 400 g/15 mm was taken as the heat sealing temperature.

TABLE 2

| EVOH pellets or EVOH composition pellets | EVOH | | | Modified EVOH (b) | | Plasticizer (d) | | Heat sealing temperature (° C.) |
|---|---|---|---|---|---|---|---|---|
| | Ethylene content (mol %) | Degree of saponification (mol %) | Amount (wt %) | Name | Amount (wt %) | Name | Amount (wt %) | |
| EVOH 1 | 32 | 99.6 | 100 | — | — | — | — | 180 |
| EVOH 2 | 44 | 96.5 | 100 | — | — | — | — | 155 |
| EVOH 3 | — | — | — | Synthesis Example 1[*1)] | 100 | — | — | 145 |
| EVOH 4 | 32 | 99.6 | 80 | Synthesis Example 1[*1)] | 20 | — | — | 170 |
| EVOH 5 | 32 | 99.6 | 90 | — | — | Polyethylene glycol | 10 | 165 |

[*1)]Modified EVOH obtained in Synthesis Example 1

Example 1

(1) Production of Multilayered Pellets

Pellets of the EVOH 2 were supplied to a twin screw extruder (46 φ mm. L/D 30), and pellets of the EVOH 1 were supplied to a single screw extruder (30 φ mm, L/D=22). Molten resins of EVOH 2 and EVOH 1 were supplied from the respective extruders at a temperature of 210° C. to a core-shell type die (four nozzles), and the extruded into four strands. The strands were introduced in a water bath for cooling, and cut with a pelletize, resulting in multilayered pellets having an outer diameter of 3 mm and a shell thickness (thickness of the outer layer) of 0.15 m. The core-shell ratio of the multilayered pellets was core/shell=9/1 (weight ratio). The pellets immediately after being cut did not stick to each other, that is, good multilayered pellets were obtained.

(2) Measurement of Water Content of Pellets

The water content of the obtained multilayered pellets immediately after being cut was measured by the Karl Fischer method, with the following apparatus and under the following measurement conditions. As a result of the measurement, the water content was 0.22%.

Apparatus: CA-06/VA-06 manufactured by Mitsubishi Chemical Corporation
Solvent: AQUAIMICRON AX/CXU
Heating temperature: 205° C.

(3) Measurement of Moisture Absorption Rate of Pellets

The obtained multilayered pellets were dried or the pellets were allowed to stand in the air such that the water content of the multilayered pellets was approximately 0.2%. The multilayered pellets after the water content adjustment were allowed to stand in an atmosphere of 20° C. and 85% RH for 24 hours. The water content was again measured, and the moisture absorption rate of the pellets was obtained by the equation below.

Moisture absorption rate of pellets (%/day)=(water content after being allowed to stand for 24 hours)−(water content before being allowed to stand for 24 hours)

As a result, the moisture absorption rate of the pellets was 0.11%/day.

(4) Production of Single Layered Film

From the thus obtained multilayered pellets, a single layered film having a thickness of 25 μm was formed using a film-forming apparatus comprising a 40 φ extruder (PLABOR GT-40-A manufactured by PLABOR Co., Ltd.) and a T-die under the following extrusion conditions.

Model: single screw extruder (non-vent type)
L/D: 24
Inner diameter of extruder: 40 mm φ
Screw: fullflighted type single threaded screw, nitrided steel on surface
Screw rotational speed: 40 rpm
Die: coat-hanger die with width of 550 mm
Lip gap: 0.3 mm
Cylinder and die temperature setting: C1/C2/C3/adaptor/die =180° C./200° C./210° C./210° C./210° C.

Haze and oxygen permeation rate were measured and bending resistance was evaluated with respect to the obtained single layered film according to the following methods.

(4-1) Measurement of Haze

The haze of the produced single layered film was measured using an integrating sphere-type H.T.R meter manufactured by Nippon Seimitsu Kogaku Co., Ltd. according to the method of JIS D8741. The haze was 0.2%, that is, extremely good transparency was exhibited

(4-2) Measurement of Oxygen Permeation Rate

The produced single layered film was subjected to humidity adjustment at 20° C. and 65% RH for 5 days. The oxygen permeation rate of two single layered films after the humidity adjustment was measured using MOCON OX-TRAN2/20 manufactured by Modern Control Corp, at 20° C. and 65% RH, according to the method (the equal pressure method) described in JIS K7126, and the average value was calculated. The oxygen permeation rate was 4.0 cc·20 μm/m$^2$·day·atm, that is, good gas barrier properties were exhibited.

(4-3) Evaluation of Bending Resistance

In this measurement, 50 sheets of the produced single layered films that had been cut into a size of 21 cm×30 cm were produced, and the humidity of each of the films was adjusted at 20° C. and 65% RH for 5 days. According to ASTM F 392-74, the films were bent 50 times, 75 times. 100 times, 125 times, 150 times, 175 times, 200 times, 225 times, 250 times, or 300 times, and the number of pinholes was measured using a Gelbo Flex Tester manufactured by Rigaku Kogyo Co., Ltd. At each number of bending times, measurement was performed 5 times, and the average value of the pinholes was taken as the number of pinholes. The measurement results were plotted taking the number of bending times (P) on the horizontal axis and the number of pinholes (N) on the vertical axis, and the number of bending times (Np1) corresponding to the number of pinholes 1 was obtained as an extrapolated value with two significant figures. As a result, Np1 was 70 times, that is, extremely excellent bending resistance was exhibited.

(5) Production of Single Layered Sheet

From the obtained multilayered pellets, a single layered sheet having a thickness of 150 μm was produced using a film-forming apparatus comprising an extruder with an inner diameter of 40 mm (PLABOR GT-40-A, manufactured by PLABOR Co., Ltd.) and a T-die, under the following extrusion conditions.

Model: single screw extruder (non-vent type)
L/D: 24
Inner diameter of extruder: 40 mm φ
Screw: full-flighted type single threaded screw, nitrided steel on surface
Screw rotational speed: 100 rpm
Die: coat-hanger die with width of 550 mm
lip gap: 0.3 mm
Cylinder and die temperature setting: C1/C2/C3/adaptor/die=180° C./200° C./210° C./210° C./210 ° C.

(5-1) Evaluation of Stretching Properties of Single Layered Sheet

The produced single layered sheet was set in a pantograph-type biaxial stretching apparatus manufactured by Toyo Seiki Seisaku-sho, Ltd., and simultaneous biaxial stretching was performed at a predetermined stretch ratio at 100° C. The stretching was conducted plurality of times while changing the stretch ratio in the range of 2.0×2.0 folds to 5.0×5.0 folds (changing the stretch ratio by 0.25×0.25 folds). The maximum stretch ratio was 3.0×3.0 folds, at which stretching was conducted satisfactory without breaking the sheet.

The evaluation results of the multilayered pellets are summarized in Table 3, and the evaluation results of the obtained film or sheet are summarized in Table 4.

Example 2

Pellets of the EVOH 3 were supplied to a twin screw extruder and pellets of the EVOH 1 were supplied to a single screw extruder so that multilayered pellets were produced as in Example 1. The core-shell ratio of the multilayered pellets was core/shell=9/1 (weight ratio). The pellets immediately after being cut did not stick to each other, that is, good multilayered pellets were obtained. The thus obtained multilayered pellets were evaluated as in Example 1. Furthermore, a single layered film and a single layered sheet were produced as in Example 1, and evaluations as in Example 1 were performed. The evaluation results of the multilayered pellets are summarized in Table 3, and the evaluation results of the film and the sheet are summarized in Table 4.

Example 3

A blend obtained by dry-blending 80 parts by weight of pellets of the EVOH 1 and 20 parts by weight of pellets of the EVOH 3 was supplied to a twin screw extruder, and pellets of the EVOH 1 were supplied to a single screw extruder, so that multilayered pellets were produced as in Example 1. The core-shell ratio of the multilayered pellets was core/shell=9/1 (weight ratio). The pellets immediately after being cut did not stick to each other, that is, good multilayered pellets were obtained. The thus obtained multilayered pellets were evaluated as in Example 1. Furthermore, a single layered film and a single layered sheet were produced as in Example 13 and evaluations as in Example 1 were performed. The evaluation results of the multilayered pellets are summarized in Table 3, and the evaluation results of the film and the sheet are summarized in Table 4.

Example 4

Pellets of the EVOH 1 in an amount of 90 parts by weight were supplied to a twin screw extruder, 10 parts by weight of polyethylene glycol (trade name: PEG-600) manufactured by Sanyo Chemical Industries. Ltd. was side-fed as the plasticizer (d) using a gear pump, and the mixture was kneaded in the extruder. Furthermore, pellets of the EVOH 1 were supplied to a single screw extruder, so that multilayered pellets were produced as in Example 1. The core-shell ratio of the multilayered pellets was core/shell=9/1 (weight ratio). The pellets immediately after being cut did not stick to each other, that is, good multilayered pellets were obtained. The thus obtained multilayered pellets were evaluated as in Example 1. Furthermore, a single layered film and a single layered sheet were produced as in Example 1, and evaluations as in Example 1 were performed The evaluation results of the multilayered pellets are summarized in Table 3, and the evaluation results of the film and the sheet are summarized in Table 4.

Comparative Example 1

Pellets of the EVOH 1 were supplied to each of a twin screw extruder and a single screw extruder so that multilayered pellets were produced as in Example 1. The core-shell ratio of the multilayered pellets was core/shell=9/1 (weight ratio). The thus obtained multilayered pellets were evaluated as in Example 1. Furthermore, a single layered film and a single layered sheet were produced as in Example 1, and evaluations as in Example 1 were performed. The evaluation results of the multilayered pellets are summarized in Table 3, and the evaluation results of the film and the sheet are summarized in Table 4. It is shown that the obtained film is poor in bending resistance and stretching properties.

Comparative Example 2

Pellets of the EVOH 2 were supplied to each of a twin screw extruder and a single screw extruder so that multilayered pellets were produced as in Example 1. The core-shell ratio of the multilayered pellets was core/shell=9/1 (weight ratio). The evaluation results of the multilayered pellets are summarized in Table 3. The pellets immediately after being cut stuck to each other. Thus, it was concluded that production of a single layered film and a single layered sheet as in Example 1 was difficult because the pellets were difficult to handle in melt-molding. Accordingly, the subsequent evaluations were not performed.

Comparative Example 3

Pellets of the EVOH 2 were supplied to a twin screw extruder and pellets of the EVOH 1 were supplied to a single screw extruder so that multilayered pellets were produced as in Example 1. The core-shell ratio of the multilayered pellets was core/shell=99.5/0.5 (weight ratio). In an observation of a cutting face of the pellets, it was found that a good core-shell structure was not formed, and the core component appeared on the surface of the pellets. The evaluation results of the multilayered pellets are summarized in Table 3. The pellets immediately after being cut stuck to each other. Thus, it was concluded that production of a single layered film and a single layered sheet as in Example 1 was difficult because the pellets were difficult to handle in melt-molding. Accordingly, the subsequent evaluations were not performed.

Comparative Example 4

Pellets of the EVOH 3 were supplied to each of a twin screw extruder and a single screw extruder, so that multilayered pellets were produced as in Example 1. The core-shell ratio of the multilayered pellets was core/shell=9/1 (weight ratio). The evaluation results of the multilayered pellets are summarized in Table 3. The pellets immediately after being cut stuck to each other. Thus, it was concluded that production of a single layered film and a single layered sheet as in Example 1 was difficult because the pellets were difficult to handle in melt-molding. Accordingly, the subsequent evaluations were not performed.

Comparative Example 5

Pellets of the EVOH 4 were supplied to each of a twin screw extruder and a single screw extruder, so that multilayered pellets were produced as in Example 1. The core-shell ratio of the multilayered pellets was core/shell=9/1 (weight ratio). The evaluation results of the multilayered pellets are summarized in Table 3. The pellets immediately after being cut stuck to each other. Thus, it was concluded that production of a single layered film and a single layered sheet as in Example 1 was difficult because the pellets were difficult to handle in melt-molding. Accordingly, the subsequent evaluations were not performed.

Comparative Example 6

Pellets of the EVOH 1 in an amount of 90 parts by weight were supplied to a twin screw extruder, 10 parts by weight of polyethylene glycol (trade name: PEG-600) manufactured by Sanyo Chemical Industries, Ltd. was side-fed as the plasticizer (d) using a gear pump, and the mixture was kneaded in the extruder. Furthermore, pellets of the EVOH 5 were supplied to a single screw extruder so that multilayered pellets were produced as in Example 1. The core-shell ratio of the multilayered pellets was core/shell=9/1 (weight ratio). The evaluation results of the multilayered pellets are summarized in Table 3. The pellets immediately after being cut stuck to each other. Thus, it was concluded that production of a single layered film and a single layered sheet as in Example 1 was difficult because the pellets were difficult to handle in melt-molding. Accordingly, the subsequent evaluations were not performed.

TABLE 3

| | Multilayered pellet | | | | | | |
|---|---|---|---|---|---|---|---|
| | EVOH resin composition (A) for core | EVOH resin composition (B) for shell | Core/shell ratio (%) | TB-TA (° C.) | Sticking of pellets | Water content (%) of pellets | Moisture absorption rate (%/day) of pellets |
| Ex. 1 | EVOH 2 | EVOH 1 | 90/10 | 25 | not stick | 0.22 | 0.11 |
| Ex. 2 | EVOH 3 | EVOH 1 | 90/10 | 35 | not stick | 0.27 | 0.16 |
| Ex. 3 | EVOH 4 | EVOH 1 | 90/10 | 10 | not stick | 0.25 | 0.14 |
| Ex. 4 | EVOH 1 + Pasticizer*[1] | EVOH 1 | 90/10 | 15 | not stick | 0.29 | 0.22 |
| Com. Ex. 1 | EVOH 1 | EVOH 1 | 90/10 | 0 | not stick | 0.23 | 0.13 |
| Com. Ex. 2 | EVOH 2 | EVOH 2 | 90/10 | 0 | stick | 0.30 | 0.21 |
| Com. Ex. 3 | EVOH 2 | EVOH 1 | 99.5/0.5 | 25 | stick | 0.32 | 0.20 |
| Com. Ex. 4 | EVOH 3 | EVOH 3 | 90/10 | 0 | stick | 0.45 | 0.31 |
| Com. Ex. 5 | EVOH 4 | EVOH 4 | 90/10 | 0 | stick | 0.34 | 0.24 |
| Com. Ex. 6 | EVOH 1 + plasticizer*[1] | EVOH 5 | 90/10 | 0 | stick | 0.67 | 0.46 |

*[1]EVOH 1 and plasticizer were mixed and a composition similar to EVOH 5 was obtained.

TABLE 4

| | Single layered film or single layered sheet | | | |
|---|---|---|---|---|
| | Haze (%) | Oxygen permeation rate*[1] | Bending resistance (Np1)*[2] | Maximum stretch ratio of single layered sheet (folds) |
| Ex. 1 | 0.2 | 4.0 | 70 | 3.0 × 3.0 |
| Ex. 2 | 0.3 | 1.1 | 150 | 4.25 × 4.25 |
| Ex. 3 | 0.1 | 0.4 | 90 | 3.75 × 3.75 |
| Ex. 4 | 1.1 | 0.9 | 75 | 3.5 × 3.5 |
| Com. Ex. 1 | 0.4 | 0.3 | 34 | 2.25 × 2.25 |
| Com. Ex. 2 | — | — | — | — |
| Com. Ex. 3 | — | — | — | — |
| Com. Ex. 4 | — | — | — | — |
| Com. Ex. 5 | — | — | — | — |
| Com. Ex. 6 | — | — | — | — |

*[1]unit: cc · 20 μm/m² · day · atm
*[2]Np1: number of bending times until one pinhole is generated.
Comparative Examples 2 to 6: "—" indicates that measurement was not performed because a film could not be prepared.

INDUSTRIAL APPLICABILITY

According to the present invention, a multilayered pellet that has a low moisture absorption rate and that does not cause sticking is provided. By the use of the pellet, an EVOH resin molded article that is excellent in barrier properties, transparency, stretching properties, flexibility, and bending resistance can be produced. The multilayered pellet is easily handled during production of various molded articles. The multilayered pellet is preferably used for producing various molded articles such as films, sheets, tubes, and bottles that are required to have properties such as barrier properties and flexibility.

The invention claimed is:
1. A multilayered pellet having a core-shell structure,
wherein the core of the core-shell structure is made of an ethylene-vinyl alcohol copolymer resin composition (A), and the shell of the core-shell structure is made of an ethylene-vinyl alcohol copolymer resin composition (B),
wherein the ethylene-vinyl alcohol copolymer resin composition (A) comprises any on of (i) to (iii):
(i) an ethylene-vinyl alcohol copolymer (a) and a modified ethylene-vinyl alcohol copolymer (b);
(ii) a modified ethylene-vinyl alcohol copolymer (b); and
(iii) an ethylene-vinyl alcohol copolymer (a) and a plasticizer (d),
wherein the modified ethylene-vinyl alcohol copolymer (b) is at least one selected from the group consisting of the following compounds (1) to (4):
(1) a modified ethylene-vinyl alcohol copolymer (b.1) containing 0.3 to 40 mol % of a unit of Formula (1) and 5 to 55 mol % of an ethylene unit:

wherein $R^1$, $R^{2,}$ $R^{3,}$ and $R^4$ represent each independently a hydrogen atom, an aliphatic hydrocarbon group having 1 to 10 carbon atoms, an alicyclic hydrocarbon group having 3 to 10 carbon atoms, or an aromatic hydrocarbon group having 6 to 10 carbon atoms, $R^3$ and $R^4$ may be bonded to each other, and $R^1$, $R^{2,}$ $R^3$ and $R^4$ may have a hydroxyl group, a carboxyl group, or a halogen atom;
(2) a modified ethylene-vinyl alcohol copolymer obtained by reacting an ethylene-vinyl alcohol copolymer (a) and a monovalent epoxy compound (c) having a molecular weight of not greater than 500;
(3) a modified ethylene-vinyl alcohol copolymer having an ionizable group at its terminal, wherein the ionizable group is selected from the group consisting of a sulfonic acid group and its salt, a carboxylic acid group and its salt, and an ammonium group; and
(4) a modified ethylene-vinyl alcohol copolymer obtained by oxidizing an ethylene-vinyl alcohol copolymer, and
wherein a heat sealing temperature (TA) (° C.) of the ethylene-vinyl alcohol copolymer resin composition (A)

and a heat sealing temperature (TB) (° C.) of the ethylene-vinyl alcohol copolymer resin composition (B) satisfy Formula (1):

$$3 \leq TB-TA \leq 100 \qquad (1)$$

wherein the heat sealing temperature (TA) is a lower limit of an adhesion temperature at which peel strength is at least 400 g/15 mm, wherein the peel strength is determined by the process of heat-sealing two films, each being made of the ethylene-vinyl alcohol copolymer resin composition (A), at a pressure of 0.98 MPa for 1 second, and conducting T-peel test with a tensile tester at a tensile speed of 250 mm/mm, and wherein the heat sealing temperature (TB) is a lower limit of an adhesion temperature at which peel strength is at least 400 g/15 mm, wherein the peel strength is determined by the process of heat-sealing two films, each being made of the ethylene-vinyl alcohol copolymer resin composition (B), at a pressure 0.98 MPa for 1 second, and conducting T-peel test with a tensile tester at a tensile speed of 250 mm/min.

2. The multilayered pellet according to claim 1, wherein the weight ratio between the ethylene-vinyl alcohol copolymer resin composition (A) and the ethylene-vinyl alcohol copolymer resin composition (B) is 5/95 to 99/1.

3. The multilayered pellet according to claim 1, wherein the modified ethylene-vinyl alcohol copolymer (b) is the modified ethylene-vinyl alcohol copolymer (b.1).

4. The multilayered pellet according to claim 3, wherein both of the $R^1$ and $R^2$ are hydrogen atoms.

5. The multilayered pellet according to claim 3, wherein one of the $R^3$ and $R^4$ is an aliphatic hydrocarbon group having 1 to 10 carbon atoms, and the other is a hydrogen atom.

6. The multilayered pellet according to claim 3, wherein one of the $R^3$ and $R^4$ is $(CH_2)_iOH$ (wherein i is an integer of 1 to 8), and the other is a hydrogen atom.

7. The multilayered pellet according to claim 1, wherein the modified ethylene-vinyl alcohol copolymer (b) is obtained by reacting the ethylene-vinyl alcohol copolymer (a) and the monovalent epoxy compound (c) having a molecular weight of not greater than 500.

8. The multilayered pellet according to claim 1, wherein the ethylene-vinyl alcohol copolymer resin composition (A) comprises the ethylene-vinyl alcohol copolymer (a) and the plasticizer (d).

9. The multilayered pellet according to claim 1, wherein the ethylene-vinyl alcohol copolymer resin composition (A) comprises: (3) a modified ethylene-vinyl alcohol copolymer having an ionizable group at its terminal, wherein the ionizable group is selected from the group consisting of a sulfonic acid group and its salt, a carboxylic acid group and its salt, and an ammonium group; or (4) a modified ethylene-vinyl alcohol copolymer obtained by oxidizing an ethylene-vinyl alcohol copolymer.

* * * * *

UNITED STATES PATENT AND TRADEMARK OFFICE
CERTIFICATE OF CORRECTION

PATENT NO. : 7,507,476 B2
APPLICATION NO. : 11/574590
DATED : March 24, 2009
INVENTOR(S) : Syukiti Kawamura It is certified that error appears in the above-identified patent and that said Letters Patent is hereby corrected as shown below:

Column 1, line 25, "(B1)" should read --(B1).--.
Column 1, line 26, "46" should read --45--.
Column 1, line 27, "more" should read --more.--
Column 2, line 31, "fro" should read --from--.
Column 3, line 15, "g/1" should read --g/15--.
Column 3, line 54, "flexibility;" should read --flexibility,--.
Column 4, lines 41 through 42, "γ-ethacryloxypropylmethoxysi-lane;" should read --γ-methacryloxypropylmethoxysilane;--.
Column 4, line 42, "alkyithiols;" should read --alkylthiols;--.
Column 5, line 25, "herein," should read --Herein,--.
Column 5, line 26, "berates," should read --borates,--.
Column 6, line 8, "extruder fit" should read --extruder. At--.
Column 6, line 35, "007" should read --0.07--.
Column 6, line 36, "0.05" should read --0.075--.
Column 8, line 39, "190°0 C.," should read --190°C.,--.
Column 9, line 9, "(VII)" should read --(VIII)--.
Column 9, line 45, "ethylene" should read --(ethylene--.
Column 9, line 53, "-epoxyhexane." should read -- -epoxyhexane,--.
Column 9, line 63, should read --epoxyheptane, 5-methyl-3,4-epoxyheptane, 5-ethyl-3,4- --.
Column 10, line 3, "4,6-epoxydecane," should read --4,5-epoxydecane,--.
Column 10, line 18, "ether" should read --ether,--.
Column 10, line 29, "-butoxypertane," should read -- -butoxypentane,--.
Column 10, line 39, "-epoxy 1" should read -- -epoxy-1- --.
Column 10, line 50, "-epoxypropoxy-" should read -- -epoxy) propoxy- --.
Column 10, line 62, "3,4-epoxy 5-" should read --3,4-epoxy-5- --.
Column 11, line 3, "3" should read --3,--.
Column 11, line 4, "4-epoxy-3-decanol," should read --4,5-epoxy-3-decanol,--.
Column 11, line 65, "methoxide" should read --methoxide.--.
Column 12, line 25, "extruders" should read --extruders.--.
Column 12, line 31, "complicated" should read --complicated.--.
Column 12, line 61, "EVOH" should read --EVOH.--.

Signed and Sealed this

Thirtieth Day of November, 2010

David J. Kappos
*Director of the United States Patent and Trademark Office*

CERTIFICATE OF CORRECTION (continued)
U.S. Pat. No. 7,507,476 B2

Column 12, line 67, "example" should read --example.--.
Column 13, line 17, "glycol.)" should read --glycol).--.
Column 13, line 25, "disodecyl" should read --diisodecyl--.
Column 13, line 39, "atoms)" should read --atoms).--.
Column 13, line 42, "dihydroxy" should read --dihydroxy)--.
Column 14, line 39, "example." should read --example,--.
Column 15, line 33, "-Ta" should read -- -TA--.
Column 15, line 53, "mixers" should read --mixer,--.
Column 16, line 15, "ACMt" should read --ACM--.
Column 16, line 53, "3.5 mm" should read --3.5 mm.--.
Column 17, line 43, "form" should read --from--.
Column 17, line 50, ".day-atm," should read --·day·atm,--.
Column 17, line 52, "μ/m$^2$" should read -- μm/m$^2$--.
Column 17, line 58, "6%" should read --65%--.
Column 18, line 39, "transparency;" should read --transparency,--.
Column 18, line 39, "properties." should read --properties,--.
Column 21, line 20, "copolymoer" should read --copolymer--.
Column 21, line 22, "-2,6/6,6)." should read --2,6/6,6),--.
Column 21, line 33, "polyethylene" should read --poly(ethylene--.
Column 21, line 34, "terephthalate)." should read --terephthalate),--.
Column 21, line 35, "polylethylene" should read --poly(ethylene--.
Column 21, line 49, "resin (X)" should read --resin(X).--.
Column 21, line 50, "elastomer" should read --elastomer.--.
Column 22, line 13, "glycol." should read --glycol,--.
Column 22, line 17, "alhphatic" should read --aliphatic--.
Column 22, line 34, "glycol." should read --glycol,--.
Column 23, line 11, "4-cyclohexylstyrene." should read --4-cyclohexylstyrene,--.
Column 23, line 15, "t-butoxystyrene:" should read --t-butoxystyrene;--.
Column 23, line 31, "ethylene butylene" should read --ethylene/butylene--.
Column 24, line 26, "g/min," should read --g/10 min,--.
Column 24, line 27, "g/min." should read --g/10 min.--.
Column 25, line 27, "film):" should read --film);--.
Column 26, line 1, "plasticizer." should read --plasticizer,--.
Column 27, line 7, "article." should read --article,--.
Column 27, line 28, "g10min" should read --g/10 min--.
Column 28, line 14, "methods" should read --methods.--.
Column 28, line 51, "quantified" should read --quantified.--.
Column 29, line 42, "(MFPR)" should read --(MFR)--.
Column 30, line 18, "obtained" should read --obtained.--.
Column 30, line 28, "2.5" should read --52.5--.
Column 30, line 44, "27" should read --2,--.
Column 30, line 51, "2m" should read --2--.
Column 30, line 52, "ions" should read --ions.--.
Column 31, line 6, "fuoroacetylating" should read --fluoroacetylating--.
Column 31, line 24, "NR chart Regarding" should read --NMR chart. Regarding--.
Column 33, line 37, "obtained" should read --obtained.--.
Column 33, Table 2, "composition" should read --resin composition--.
Column 35, line 3, "mm." should read --mm,--.

CERTIFICATE OF CORRECTION (continued)
U.S. Pat. No. 7,507,476 B2

Column 35, line 9, "pelletize," should read --pelletizer,--.
Column 35, line 11, "0.15m." should read --0.15 mm.--.
Column 35, line 26, "AQUAIMICRON" should read --AQUAMICRON--.
Column 35, line 52, "fullflighted" should read --full-flighted--.
Column 35, line 67, "exhibited" should read --exhibited.--.
Column 36, line 16, "times." should read --times,--.
Column 37, line 19, "13" should read --1,--.
Column 37, line 30, "Industries." should read --Industries,--.
Column 37, line 40, "performed" should read --performed.--.
Column 39, line 65, "on" should read --one--.
Column 40, line 31, "(1)" should read --(I)--.
Column 40, line 45, " $R^2$, $R^3$," should read -- $R^2$, $R^3$,--.
Column 40, line 50, " $R^2$," should read -- $R^2$,--.
Column 41, line 13, "mm/mm," should read --mm/min,--.